(12) United States Patent
Sato

(10) Patent No.: US 6,683,638 B2
(45) Date of Patent: Jan. 27, 2004

(54) PRINT HEAD AND IMAGE FORMING APPARATUS USING MULTIPLEXED COMPENSATION DATA

(75) Inventor: Toshiki Sato, Tokyo (JP)

(73) Assignee: Oki Data Corporation, Tokyo (JP)

(*) Notice: Subject to any disclaimer, the term of this patent is extended or adjusted under 35 U.S.C. 154(b) by 33 days.

(21) Appl. No.: 10/076,294

(22) Filed: Feb. 19, 2002

(65) Prior Publication Data

US 2002/0118269 A1 Aug. 29, 2002

(30) Foreign Application Priority Data

Feb. 23, 2001 (JP) ........................................ 2001-048431

(51) Int. Cl.[7] ............................. B41J 2/45; B41J 2/385
(52) U.S. Cl. ....................................... 347/238; 347/130
(58) Field of Search ................................. 347/130, 132, 347/237, 238, 240, 247, 251

(56) References Cited

U.S. PATENT DOCUMENTS 5,990,920 A * 11/1999 Nagumo et al. ............ 347/237
6,166,757 A * 12/2000 Murano ...................... 347/240

* cited by examiner

Primary Examiner—Hai Pham
(74) Attorney, Agent, or Firm—Rabin & Berdo, P.C.

(57) ABSTRACT

A print head has driver circuitry that dynamically drives a row of driven elements, such as light-emitting elements, by driving different combinations of first and second terminals. The print head includes memory circuits storing compensation data for the driven elements, and multiplexing circuits that select the compensation data according to the combination of terminals being driven, thereby enabling the compensation data to be stored in the print head despite the use of dynamic driving. The compensation data are used in adjusting the amount of energy supplied to the driven elements. The amount of compensation data to be stored may be reduced by sharing the upper bits of the compensation data among a group of driven elements.

13 Claims, 25 Drawing Sheets

PRINT HEAD AND IMAGE FORMING APPARATUS USING MULTIPLEXED COMPENSATION DATA

BACKGROUND OF THE INVENTION

1. Field of the Invention

The present invention relates to a print head of the dynamically driven type, and an image forming apparatus employing the print head.

2. Description of the Related Art

The present invention is applicable to, for example, an electrophotographic printer in which a charged photosensitive drum is selectively illuminated to form an electrostatic latent image, which is developed by application of toner, then transferred to paper and fused onto the paper. To understand the problem addressed by the present invention, it is useful to understand the control circuits of this type of printer in some detail, so a description will be given at this point with reference to FIG. 1, which is a block diagram of the control circuits of an electrophotographic printer employing light-emitting diodes (LEDs) for illumination, and FIGS. 2 and 3, which are timing diagrams illustrating the printing operation.

The printing control unit 1 in FIG. 1 is a computing device comprising a microprocessor, read-only memory (ROM), random-access memory (RAM), input-output ports, timers, and other facilities. Upon receiving signals SG1, SG2, etc. from a higher-order controller (not visible), the printing control unit 1 generates signals that control a sequence of operations for printing dot-mapped data. The data are provided in signal SG2, which is sometimes referred to as a video signal because it supplies the dot-mapped data one-dimensionally.

The printing sequence starts when the printing control unit 1 receives a printing command from the higher-order controller by means of control signal SG1. First, a temperature (Temp.) sensor 160 is checked to determine whether the fuser 161 is at the necessary temperature for printing. If it is not, current is fed to a heater 161a to raise the temperature of the fuser 161.

When the fuser 161 is ready, the printing control unit 1 commands a motor driver 162 to drive a develop-transfer process motor (PM) 163, activates a charge signal SGC to turn on a charging power source 164, and thereby applies a voltage to a charging unit 165 that negatively charges the surface of a photosensitive drum (not visible).

In addition, a paper sensor 166 is checked to confirm that paper is present in a cassette (not visible), and a size sensor 167 is checked to determine the size of the paper. If paper is present, another motor driver 168 drives a paper transport motor (PM) 169 according to the size of the paper, first in one direction to transport the paper to a starting position sensed by a pick-up sensor 170, then in the opposite direction to transport the paper into the printing mechanism.

When the paper is in position for printing, the printing control unit 1 sends the higher-order controller a timing signal SG3 (including a main scanning synchronization signal and a sub-scanning synchronization signal) as shown in FIG. 2. The higher-order controller responds by sending the dot data for one page in the video signal SG2. The printing control unit 1 sends corresponding dot data (HD-DATA) to an LED head 2 in synchronization with a clock signal (HD-CLK). The LED head 2 comprises a linear array of LEDs for printing respective dots.

After receiving data for one line of dots in the video signal SG2 and sending the data to the LED head 2, the printing control unit 1 sends the LED head 2 a latch command by means of a load signal (HD-LOAD), causing the LED head 2 to store the print data (HD-DATA), then sends the LED head 2 a strobe signal (HD-STB-N), causing the LED head 2 to illuminate the negatively-charged photosensitive drum according to the stored print data (HD-DATA), thereby forming an electrostatic latent image made up of dots with higher potentials than their surrounding areas. In the developer (not shown), negatively charged toner particles are electrically attracted to these dots, so that a toner image is formed. FIG. 2 illustrates these operations for three consecutive lines (lines N−1, N, N+1).

FIG. 3 shows the above sequence of signals in more detail, assuming that there are four thousand nine hundred ninety-two (4992) dots per line, which is suitable for printing six hundred dots per inch (600 dpi) on A4-size paper. To speed up the printing process, the strobing of one line (e.g., line N−1) may proceed in parallel with the transfer of data for the next line (e.g., line N), and the fastest possible clock rate may also be used.

Rotation of the photosensitive drum brings the toner image to a transfer unit 171. A high-voltage transfer power source 172 turned on by control signal SG4 supplies a positive voltage to the transfer unit 171, whereby the toner image is transferred onto paper as the paper passes between the photosensitive drum and the transfer unit.

The paper bearing the transferred toner image is transported to the fuser 161. When the paper meets the fuser 161, the toner image is fused onto the paper by a combination of pressure and heat generated by the heater 161a. Finally, the printed sheet of paper passes an exit sensor 173 and is ejected from the printer.

The printing control unit 1 controls the high-voltage transfer power source 172 according to the information detected by the size sensor 167 and pick-up sensor 170 so that voltage is applied to the transfer unit 171 only while paper is passing between the transfer unit 171 and photosensitive drum. When the paper passes the exit sensor 173, the printing control unit 1 turns off the high-voltage charging power source 164 and halts the developer-transfer process motor 163.

When a series of pages are printed, the above operations are repeated.

FIG. 4 is a simplified schematic drawing showing the conventional circuit structure of the LED head 2. The print data signal HD-DATA and clock signal HD-CLK are received by a shift register comprising, for example, four thousand nine hundred ninety-two flip-flops $FF_1$, $FF_2$, ..., $FF_{4992}$. The load signal HD-LOAD is received by a corresponding number of latches $LT_1$, $LT_2$, ..., $LT_{4992}$, which latch the data output by the shift-register flip-flops when the HD-LOAD signal is active (high). The strobe signal HD-STB-N is supplied to a circuit comprising an inverter $G_0$, NAND gates $G_1$, $G_2$, ..., $G_{4992}$, and switching elements (transistors) $TR_1$, $TR_2$, ..., $TR_{4992}$ which are interconnected to drive a linear array of light-emitting diodes $LD_1$, $LD_2$, ..., $LD_{4992}$ when the strobe signal HD-STB-N is active (low), provided the print data output from the corresponding latches are high (indicating black dots). The transistors $TR_1$, $TR_2$, ..., $TR_{4992}$ operate as an array of driving elements, while the LEDs $LD_1$, $LD_2$, ..., $LD_{4992}$ operate as an array of driven elements. The power source of the current that drives the LEDs is denoted VDD.

The output signals from the latches are also supplied to a plurality of memory circuits $M_1$, $M_2$, ..., $M_{4992}$ that store compensation data for the LEDs. Several bits of compensation data (b0–b5) are output for each LED. These bits control further transistors that supply additional current to the LEDs $LD_1$, $LD_2$, ..., $LD_{4992}$ to compensate for LED-to-LED variations in the electrical characteristics of the LEDs themselves and their main driving transistors $TR_1$, $TR_2$, ..., $TR_{4992}$.

Incidentally, in the flip-flops $FF_1$, $FF_2$, ... in FIG. 4, D1, D2, ... are data input terminals and Q1, Q2, ... are data output terminals. In the latches $LT_1$, $LT_2$, ..., D is a data input terminal, Q is a data output terminal, and G is a control signal input terminal.

The memory compensation data circuits $M_1$, $M_2$, ..., $M_{4992}$ are necessary for the following reason. In a printer employing the LED head in FIG. 4, all of the LEDs $LD_1$, $LD_2$, ..., $LD_{4992}$ are switched on for the same length of time, which is determined by the strobe signal HD-STB-N. Thus if these LEDs, or their driving transistors $TR_1$, $TR_2$, ..., $TR_{4992}$, do not have perfectly uniform electrical properties, different dots will receive different amounts of optical energy. This leads to differences in the sizes of the electrostatic dots in the latent image formed on the photosensitive drum, hence to differences in the sizes of the dots printed on the page.

Typical differences in LED output are illustrated by the graph in FIG. 5. Dot position is indicated on the horizontal axis, and optical power on the vertical axis. The light-emitting diodes are disposed in a plurality of semiconductor chips, more specifically LED array chips denoted CHIP1 to CHIP26, which are driven by a like plurality of integrated driver circuits (driver ICs) DRV1 to DRV26, as illustrated at the top of FIG. 5. One hundred ninety-two LEDs are integrated in each LED array chip. The LED array chips and driver ICs are interconnected by wire bonding. The driver ICs are cascaded to form a single shift register for receiving the dot data signal HD-DATA.

The horizontal dotted lines indicate the ranges of variability of the optical power output by the LEDs in each individual LED array. The horizontal dot-dash lines indicate the range of variability of the average optical output power of the different LED arrays. Thus the dotted lines indicate ranges A of dot-to-dot variation within each array, while the dot-dash lines indicate the range B of chip-to-chip variation.

As illustrated in FIG. 5, the range B of chip-to-chip variation is much greater than the range A of dot-to-dot variation within any one chip. One conventional practice has therefore been to grade the driver IC chips and LED array chips according to their average output power, and assemble each LED head from chips of the same grade. Alternatively, the average current that must be supplied to each LED array chip to obtain a nominal average optical output can be calculated from measurements of the LED array chips, the average current supplied by each driver IC can be measured, the driver IC chips can be graded according to their average current output, and each LED array chip can be paired with a driver IC that supplies substantially the right amount of average current. In this way it is possible to reduce chip-to-chip differences, but the dot-to-dot differences within each chip remain uncorrected. Although different dot sizes are not readily noticeable on pages containing only line art or text, when photographs or similar types of images are printed, variations in dot size create density differences that can degrade the printing quality to an undesirable degree.

To compensate for such differences, compensation data are determined by measuring the output of each LED when the LED head is manufactured. The compensation data are, for example, stored in a non-volatile memory in the printing control unit and transferred to the data compensation memory circuits $M_1$, $M_2$, ..., $M_{4992}$ before printing begins. During printing, when transistor $TR_1$, for example, is turned on to drive LED $LD_1$, one or more additional transistors controlled by bits output from data compensation memory circuit $M_1$ may also be turned on. The current driving capability of these additional transistors is weighted in a doubling ratio (1:2:4:8 ... ), providing $2^n$ different levels of additional current, where n is the number of compensation bits per LED.

When the spacing of the LEDs becomes as small as 1/600 inch, however if an LED array chip has a separate bonding pad for each LED, then bonding wires must also be bonded at intervals of 1/600 inch, which is difficult, time-consuming, and expensive. The wire-bonding requirements can be reduced by a known dynamic driving scheme.

FIG. 6 illustrates an LED array chip in an LED head that employs dynamic driving. The corresponding driver IC (not visible) supplies current to anode input pads 185–188, each of which is connected to the anodes two adjacent LEDs in the array of LEDs 189–196. For example, mutually adjacent LEDs 189 and 190 are both connected by anode wiring 212 to anode input pad 185. The other adjacent pairs of LEDs are connected by other anode wiring 213–215 to the other anode input pads 186–188. The cathode terminals of the LEDs are coupled alternately to two cathode input pads 197, 198. The cathodes of all of the odd-numbered LEDs 189, 191, ..., 195 are connected by cathode wiring to cathode input pad 197; the cathodes of all of the even-numbered LEDs 190, 192, ..., 196 are connected by cathode wiring to cathode input pad 198.

LED 189 is driven by placing anode input pad 185 at the high ($V_{DD}$) logic level and cathode input pad 197 at the low (ground) logic level. Other LEDs 191, 193, 195 connected to cathode input pad 197 may also be driven at this time, by driving their anode input pads 186, 187, 188 to the high logic level, or they may be left off, by leaving their anode input pads 186, 187, 188 at the low logic level. To avoid unwanted driving of LEDs 190, 192, 193, 196, cathode input pad 198 is placed at the high logic level. After the odd-numbered LEDs 189, 191, ..., 195 have been driven in this way, the even-numbered LEDs 189, 191, ..., 195 are similarly driven by placing cathode input pad 197 at the high logic level and cathode input pad 198 at the low logic level.

This dynamic driving scheme reduces the cost of the LED head by reducing the number of bonding wires and the amount of driving circuitry needed to drive the LED array chips. It also lengthens the life of the LED head by reducing the amount of heat generated at any one time.

Since the driving current for two LEDs is supplied to the same anode input terminal, however, the circuit that supplies the current must be multiplexed. FIG. 7 shows a one-bit multiplexer comprising a pair of complementary metal-oxide-semiconductor (CMOS) AND gates 199, 200 and a CMOS OR gate 201. Input A is passed to output Y when selection signal SA is high; input B is passed to output Y when selection signal SB is high. Each logic gate 199, 200, 201 includes six transistors, so this multiplexer requires a total of eighteen transistors.

FIG. 8 illustrates the operation of the multiplexer in FIG. 7. As indicated by the arrows, the output Y is high when A and SA are both high, or B and SB are both high, and is low at other times.

FIG. 9 illustrates another type of multiplexer in which n-channel metal-oxide-semiconductor (NMOS) transistors 202, 203 are paired with p-channel metal-oxide-semiconductor (PMOS) transistors 204, 205 to form two transmission gates controlled by respective selection signals SA and SB. This multiplexer also includes CMOS inverters 206, 207, 208, 209, 210 that buffer the input and output signals and invert the selection signals for control of the PMOS transistors. Each CMOS inverter includes two transistors, so the total number of transistors in this multiplexer is fourteen.

The multiplexer in FIG. 9 operates as illustrated in FIG. 10. The output Y goes high when A and SA, or B and SB, are both high, and remains high until SA or SB goes high while the corresponding input (A or B) is low. The reason for the sustained high output is that when signals SA and SB are both low, the transmission gate transistors 202, 203, 204, 205 in FIG. 9 are all switched off, and inverter 210 cannot receive the high input signal that would be needed to produce a low output signal Y.

Since one multiplexer of the type shown in FIG. 7 or 9 is needed for each anode input pad in FIG. 6, the multiplexers occupy a significant amount of space in the driver ICs. To save space, it would be desirable to reduce the number of transistors in these multiplexers. In FIG. 7, the necessary number of transistors can be reduced from eighteen to twelve by using CMOS NAND gates instead of AND and OR gates.

In FIG. 9, however, all of the transistors shown are necessary, for the following reason. When the output of inverter 206 is high, NMOS transistor 202 cannot transmit the full high output potential of inverter 206 to inverter 210, even when the SA signal is high, due to an inadequate gate-source potential difference. Similarly, when the output of inverter 206 is low, PMOS transistor 204 cannot transmit the full low output potential of inverter 206 to inverter 210. Thus NMOS transistor is needed to transmit the low logic level to inverter 210, PMOS transistor 204 is needed to transmit the high logic level to inverter 210, and inverter 207 is needed to control PMOS transistor 204. Similarly, NMOS transistor 203, PMOS transistor 205, and inverter 209 are all needed in order to transmit the full output levels of inverter 208 to inverter 210.

The conventional multiplexers thus require at least twelve transistors (FIG. 7) or fourteen transistors (FIG. 9) per output bit.

Another problem encountered in dynamic driving is that since two (or more) LEDs are driven from the same anode input pad, compensation data cannot be stored in memory circuits in the driver ICs in the LED head as illustrated in FIG. 4. Instead, the compensation data are conventionally supplied to the driver ICs together with the print data, but this slows down the printing process.

A similar problem arises when dynamic driving is used in the print head of a thermal printer, which has heat-emitting elements requiring similar compensation.

SUMMARY OF THE INVENTION

An object of the present invention is to provide a print head that uses dynamic driving and stores compensation data for individual driven elements.

Another object of the invention is to reduce the amount of compensation data that must be stored in the print head.

Another object is to multiplex the compensation data efficiently.

The invented print head includes a row of driven elements that are connected to a plurality of first terminals and a plurality of second terminals, and driver circuitry that drives the driven elements by driving the first and second terminals. Each driven element is driven by driving a different combination of one of the first terminals and one of the second terminals. The print head also includes means for storing compensation data specifying amounts of energy to be supplied by the driver circuitry to the first terminals, and means for selecting the stored compensation data according to the combination of the first terminals and the second terminals driven by the driver circuitry. The selected compensation data are supplied to the driver circuitry. Typically, the driver circuitry drives the second terminals one at a time, and the means for selecting selects the compensation data according to the second terminal that is driven. The means for selecting enables the compensation data to be stored in the print head despite the use of dynamic driving by the driver circuitry.

The means for storing compensation data may include a first memory circuit storing common compensation data for all of the driven elements connected to one of the first terminals, and a plurality of second memory circuits storing individual compensation data for individual ones of these driven elements. Typically, the common compensation data are more significant than the individual compensation data; that is, the common compensation data include the more significant bits. By sharing part of the compensation data, this storage scheme reduces the amount of compensation data that has to be stored.

The means for selecting preferably employs a type of multiplexer in which a metal-oxide-semiconductor transistor of one channel type is connected to a plurality of metal-oxide-semiconductor transistors of the opposite channel type. Just one of these transistors is switched on at a time, either to supply a bit of compensation data, or to precharge a node to the power-supply potential or the ground potential. This circuit multiplexes data efficiently with a comparatively small number of transistors.

The driven elements may be, for example, light-emitting elements or heat-emitting elements.

The invention also provides an image-forming device including the invented print head and a printing control unit that transfers the compensation data to the print head.

DETAILED DESCRIPTION OF THE INVENTION

Figure 1:
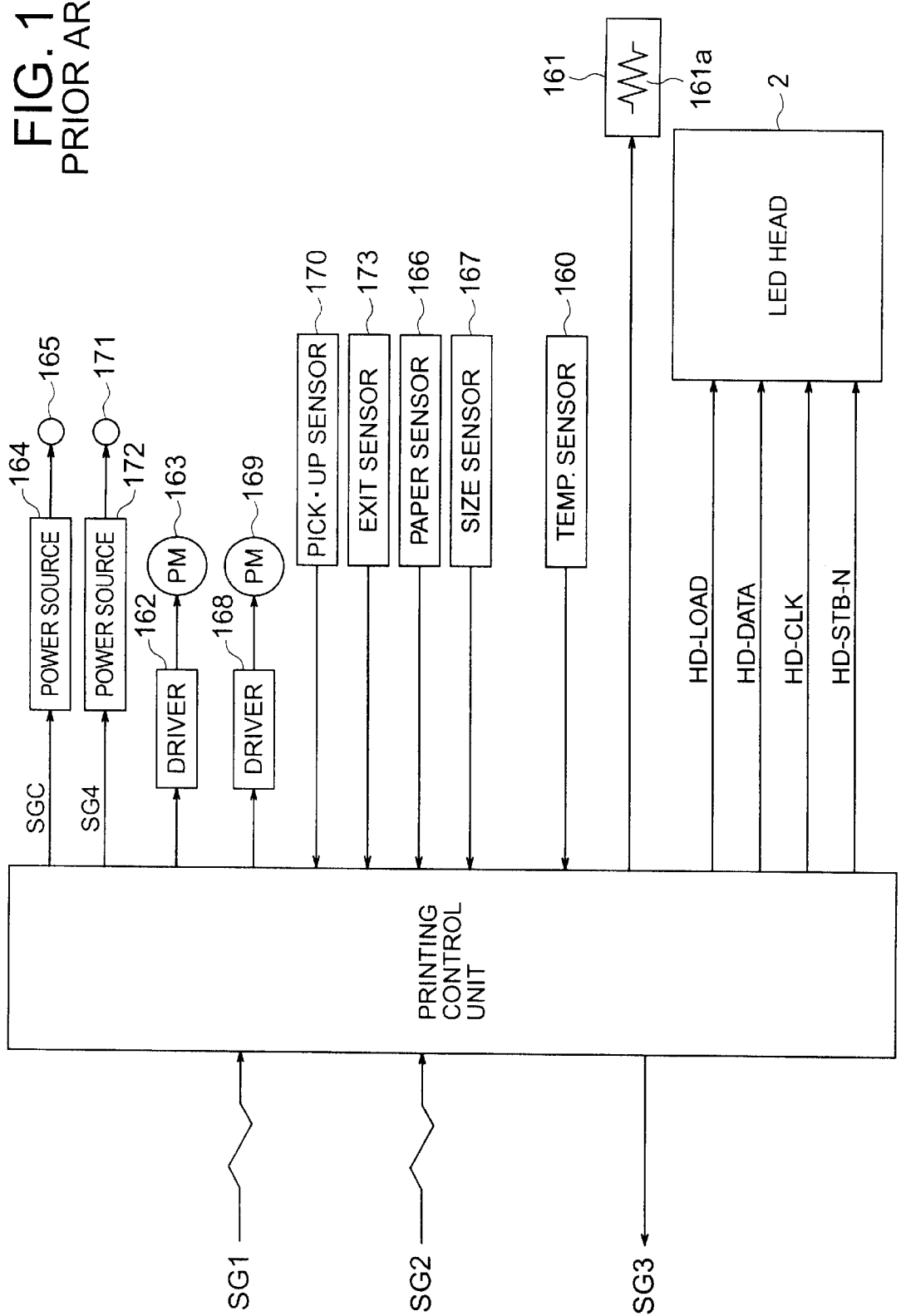
FIG. 1 is a block diagram illustrating the control system of a conventional electrophotographic printer.
Figure 2:
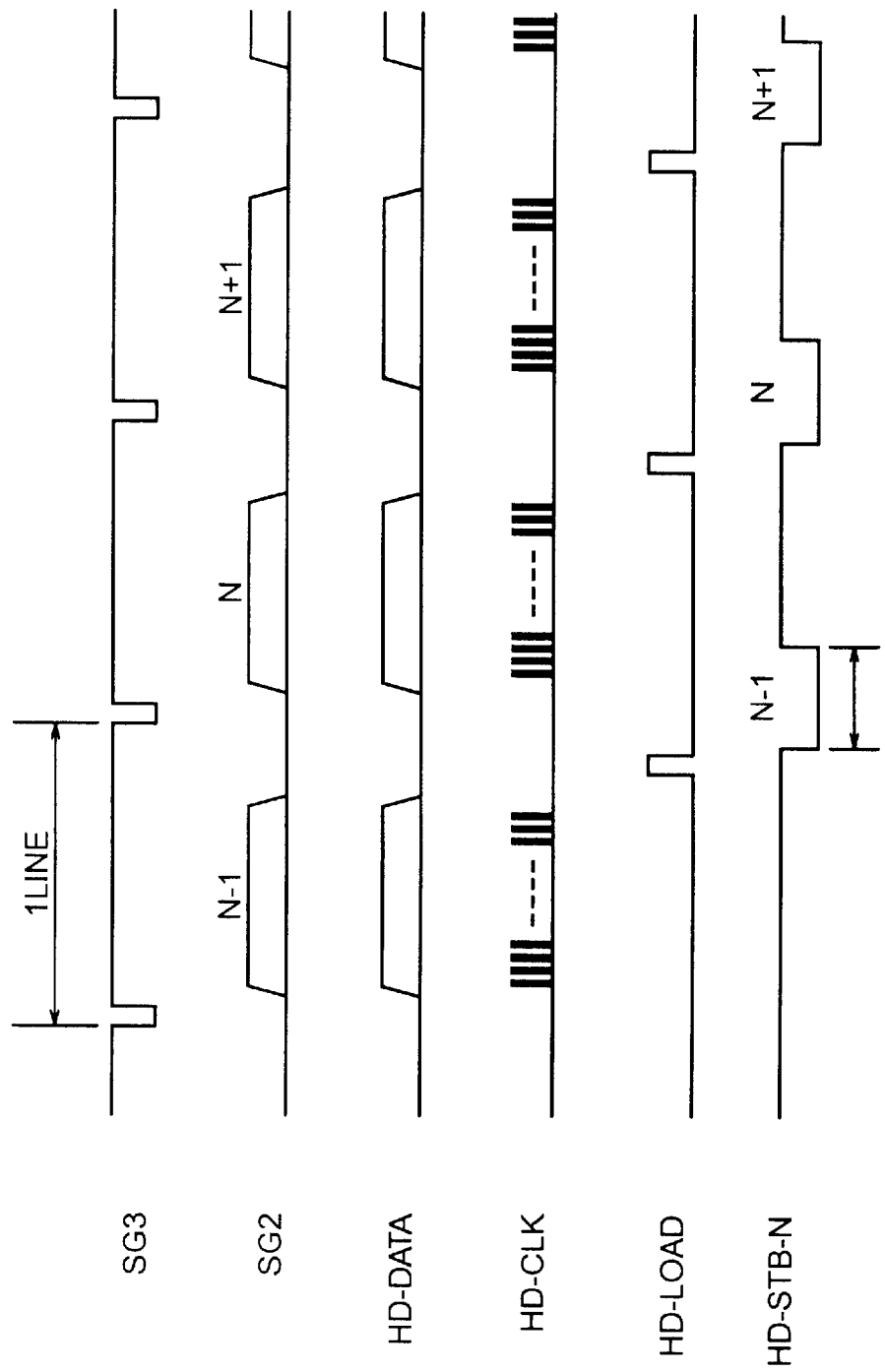
FIG. 2 is a timing diagram illustrating the operation of a conventional electrophotographic printer.
Figure 3:
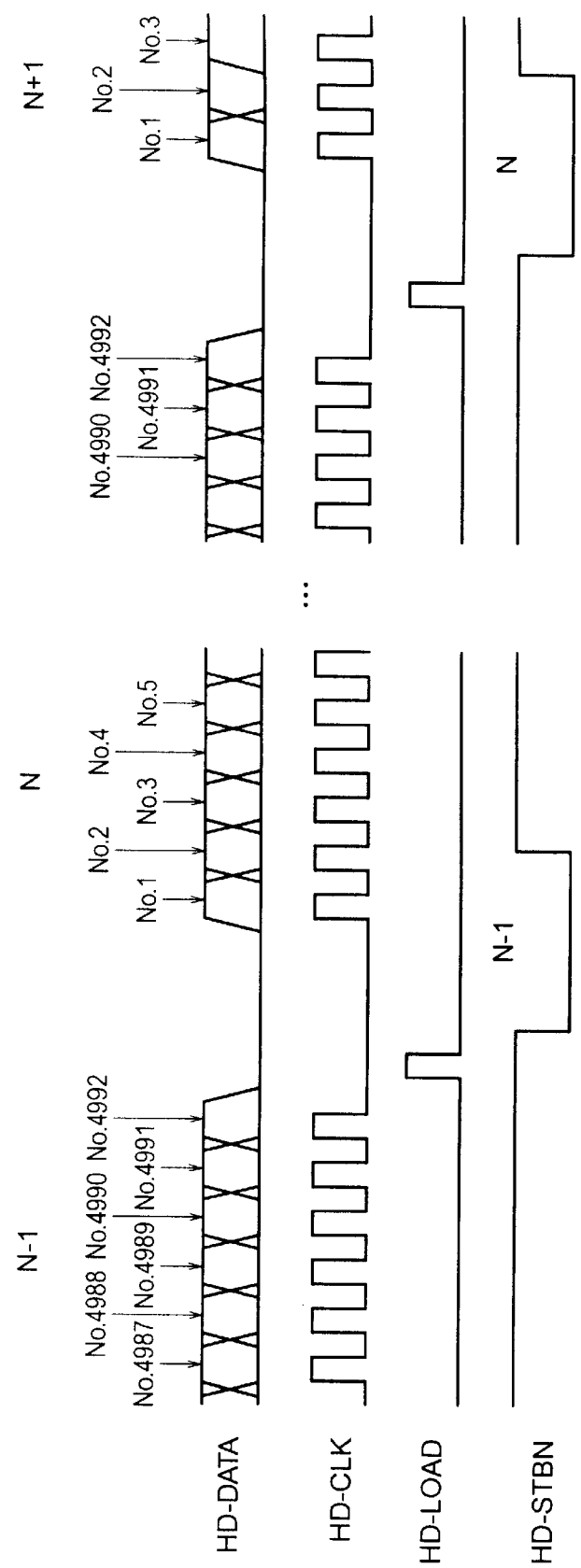
FIG. 3 is an enlarged timing diagram illustrating the signals supplied to an LED head.
Figure 4:
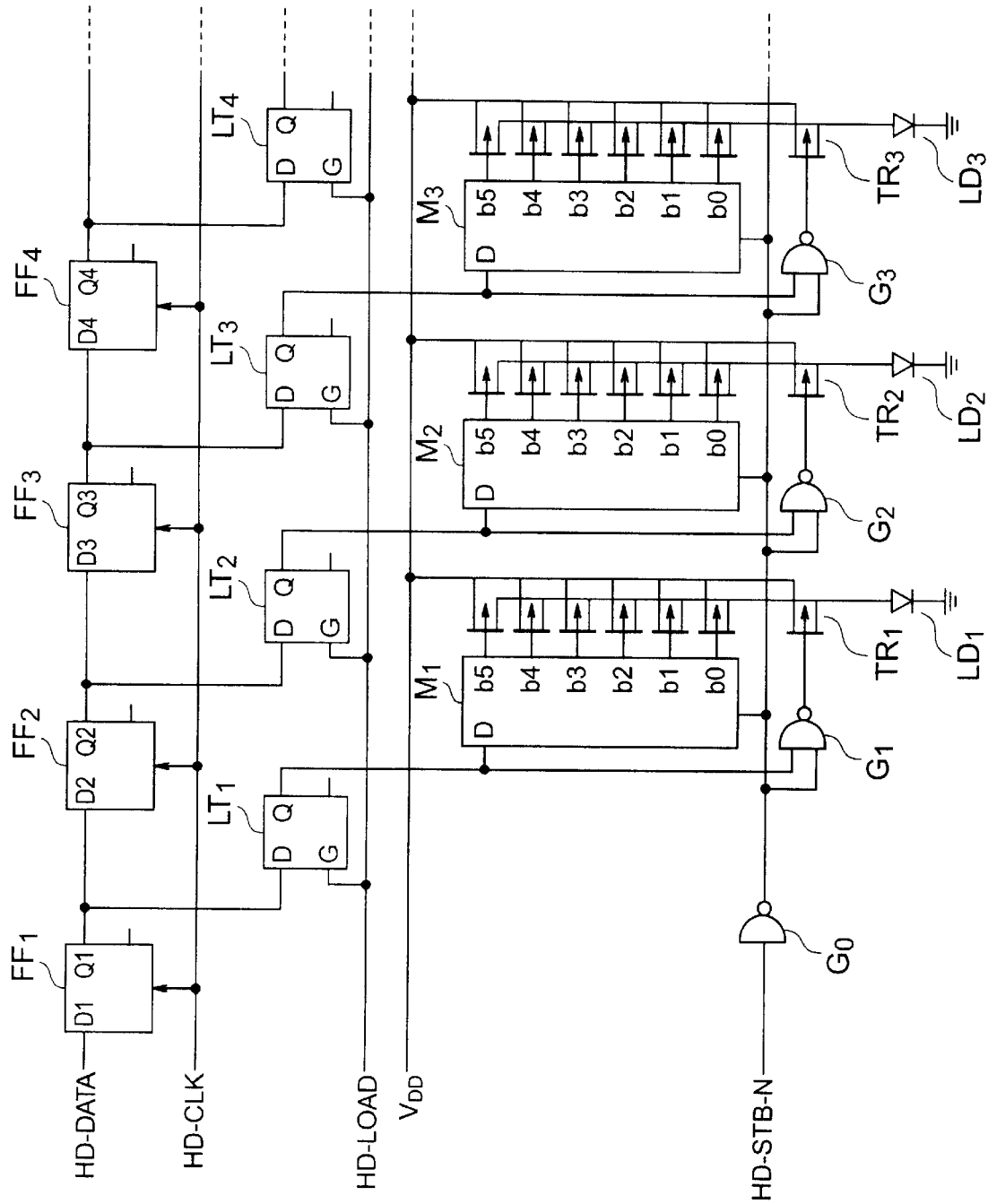
FIG. 4 is a circuit diagram of an LED head.

Embodiments of the invention will be described with reference to the attached drawings, in which like parts are indicated by like reference characters.

Figure 11:
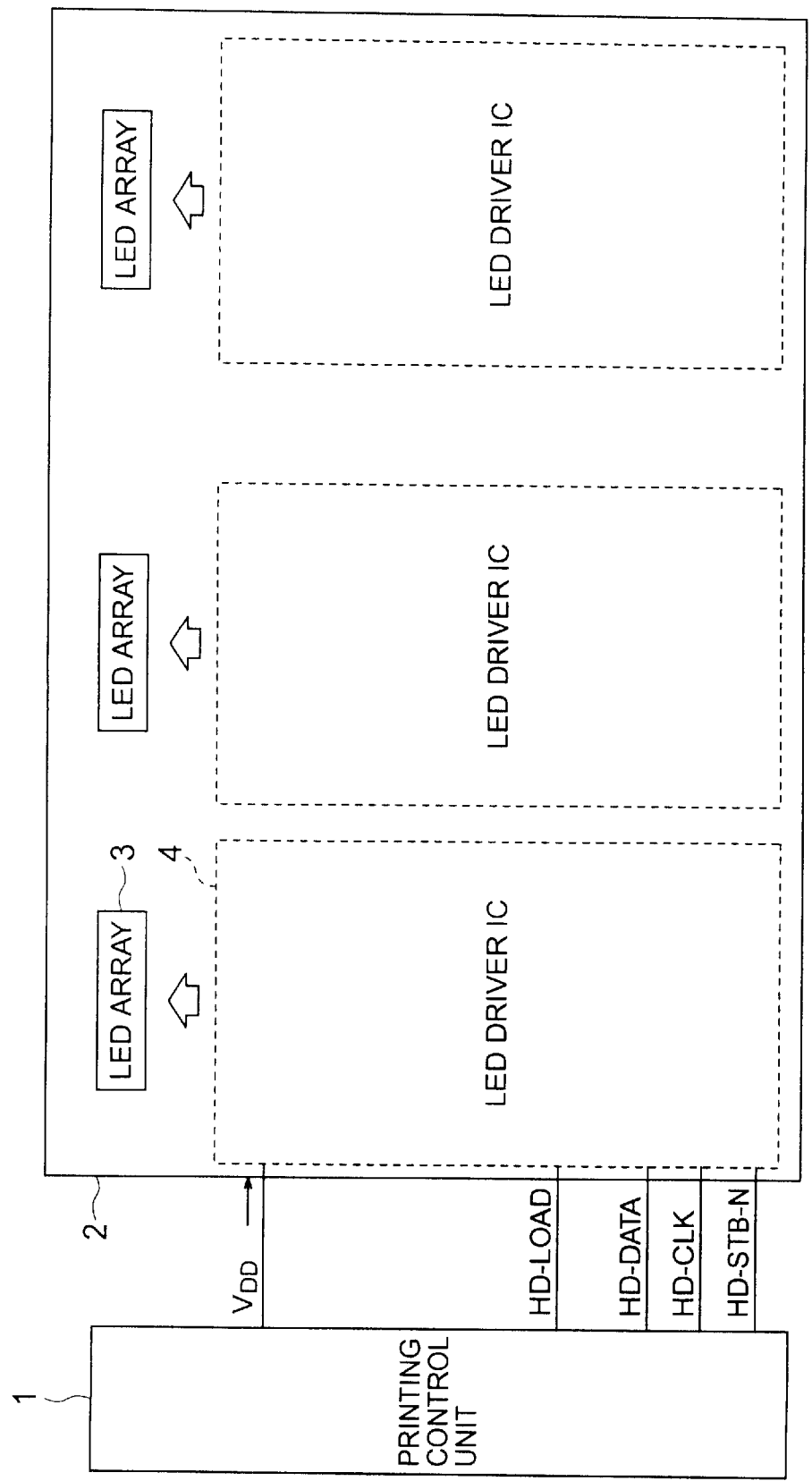
FIG. 11 is a block diagram showing the general layout of an LED head.

Referring to FIG. 11, a first embodiment is an image-forming device comprising a printing control unit 1 and an LED head 2. The printing control unit 1 supplies the LED head 2 with power ($V_{DD}$) and sends the LED head 2 a load signal HD-LOAD, a data signal HD-DATA, a clock signal HD-CLK, and a strobe signal HD-STB-N. The LED head 2 comprises a plurality of LED array chips 3 and a plurality of LED driver ICs 4, which are connected to the LED array chips 3 by gold bonding wires (not visible). The LED head 2 also includes a plurality of cathode driver ICs 5 (not visible) which are similarly connected to the LED array chips 3.

Although gold bonding wires are used in the first embodiment, when the invention is practiced, the LED array chips 3 and LED driver ICs 4 may be interconnected in other ways.

Figure 12:
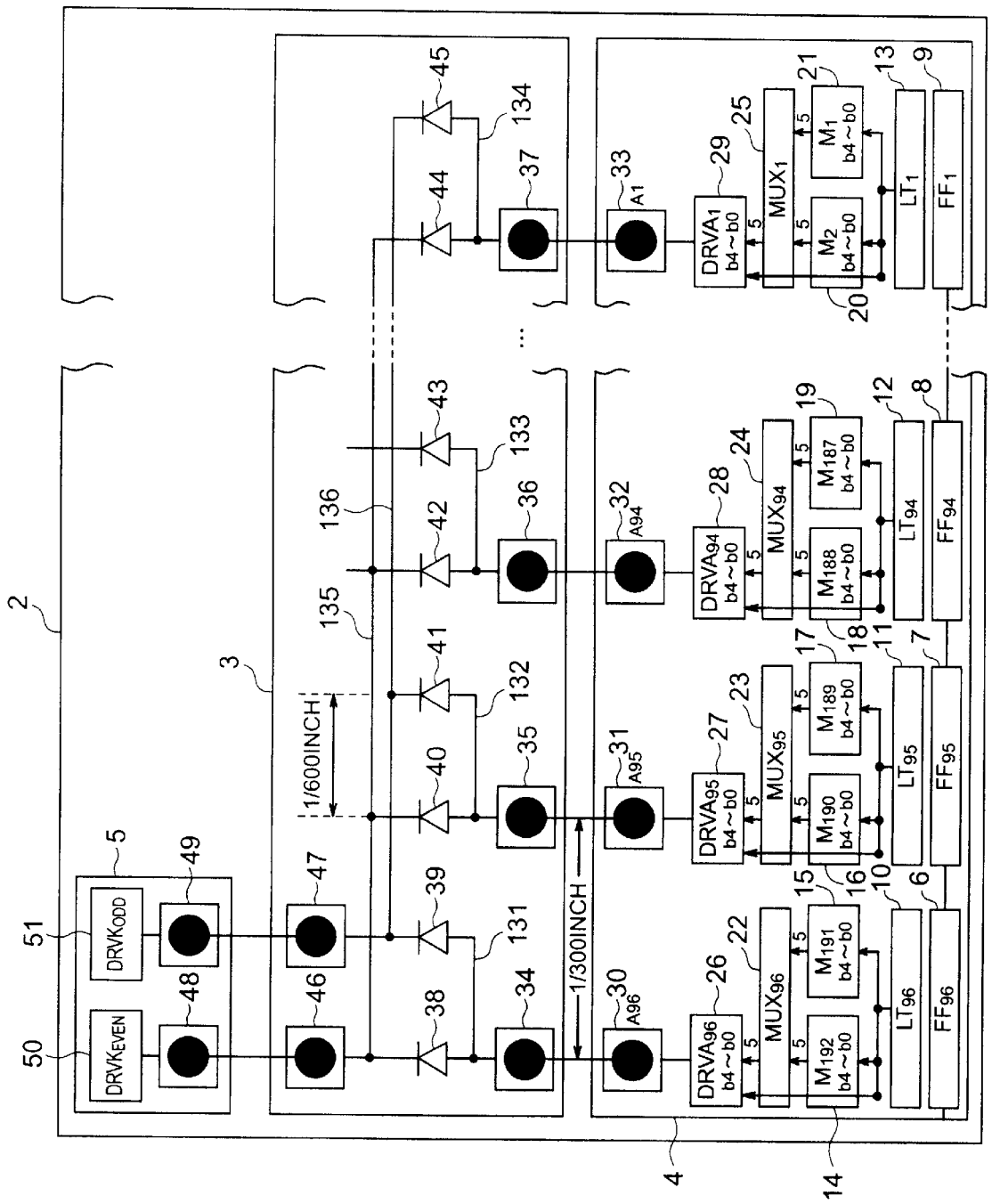
FIG. 12 is a more detailed drawing partially showing the circuit structure of an LED head according to a first embodiment of the invention.

FIG. 12 shows the internal structure of one LED array chip 3, one LED driver IC 4, and one cathode driver IC 5.

The LED driver IC 4 includes a plurality of flip-flops (FFs) 6, 7, 8, 9 that are interconnected to operate as a shift register. Data (HD-DATA) supplied by the printing control unit 1 are shifted through this shift register in synchronization with the clock signal (HD-CLK). Data shifted out from one LED driver IC are shifted into the next LED driver IC, so that the flip-flops function as a single shift register extending through all of the LED driver ICs 4.

The flip-flops 6, 7, 8, 9 are connected to a plurality of latches (LTs) 10, 11, 12, 13 that receive the data held in the flip-flops and the load signal (HD-LOAD) supplied from the printing control unit 1. The latches latch the data supplied by the flip-flops in synchronization with the load signal.

The data held in the latches 10, 11, 12, 13 are supplied to pairs of memory circuits 14, 15, . . . , 20, 21. Specifically, the output of latch 10 is supplied to memory circuits 14 and 15, the output of latch 11 is supplied to memory circuits 16 and 17, the output of latch 12 is supplied to memory circuits 18 and 19, and the output of latch 13 is supplied to memory circuits 20 and 21. Each memory circuit stores five bits of compensation data (b4-b0) in volatile memory cells such as cells of the well-known static random-access memory type.

The compensation data stored in each memory circuit are output in parallel to one of a plurality of multiplexers (MUXs) 22, 23, 24, 25. Multiplexer 22 receives compensation data from memory circuits 14 and 15, multiplexer 23 receives compensation data from memory circuits 16 and 17, multiplexer 24 receives compensation data from memory circuits 18 and 19, and multiplexer 25 receives compensation data from memory circuits 20 and 21. Each multiplexer selects the compensation data supplied from one of the two memory circuits and outputs the selected compensation data.

The data stored in the latches 10, 11, 12, 13 and the compensation data output from the multiplexers 14, 15, 16, 17 are supplied to anode drivers (DRVAs) 26, 27, 28, 29. Specifically, anode driver 26 receives data from latch 10 and multiplexer 22, anode driver 27 receives data from latch 11 and multiplexer 23, anode driver 28 receives data from latch 12 and multiplexer 24, and anode driver 29 receives data from latch 13 and multiplexer 25. Each anode driver supplies energy in the form of electrical current to an anode output pad responsive to the supplied data, in synchronization with the strobe signal (HD-STB-N).

Each anode driver comprises, for example, a main driving transistor controlled by the bit of data received from the latch, five auxiliary driving transistors, each controlled by one bit of compensation data, and logic circuitry that permits these transistors to be switched on only when the strobe signal (HD-STB-N) is active (low). The auxiliary driving transistors have, for example, progressively doubling widths, the smallest auxiliary driving transistor being controlled by the least significant bit of compensation data (b0) and the largest auxiliary driving transistor being controlled by the most significant bit of compensation data (b4). The main driving transistor and the auxiliary driving transistors are coupled in parallel between the power supply and the corresponding anode output pad, and supply energy (current) in proportion to their widths.

In FIG. 12, anode driver 26 supplies current to anode output pad 30, anode driver 27 supplies current to anode output pad 31, anode driver 28 supplies current to anode output pad 32, and anode driver 29 supplies current to anode output pad 33. These anode output pads 30, 31, 32, 33 are wire-bonded to respective anode input pads 34, 35, 36, 37 in the LED array chip 3.

In the LED array chip 3, each anode input pad is coupled to the anode terminals of a pair of light-emitting diodes (LEDs). Specifically, anode input pad 34 is coupled by anode wiring 131 to the anode terminals of LEDs 38 and 39, anode input pad 35 is coupled by anode wiring 132 to the anode terminals of LEDs 40 and 41, anode input pad 36 is coupled by anode wiring 133 to the anode terminals of LEDs 42 and 43, and anode input pad 37 is coupled by anode wiring 134 to the anode terminals of LEDs 44 and 45. The cathode terminals of the even-numbered LEDs 38, 40, 42, 44 are coupled by cathode wiring 135 to a cathode input pad 46. The cathode terminals of the odd-numbered LEDs 39, 41, 43, 45 are coupled by cathode wiring 136 to another cathode input pad 47. The cathode input pads 46, 47 are wire-bonded to respective cathode output pads 48, 49 in the cathode driver IC 5.

The cathode driver IC 5 comprises a cathode driver (DRVK$_{EVEN}$) 50 connected to cathode output pad 48, another cathode driver (DRVK$_{ODD}$) 51 connected to cathode output pad 49, and further circuitry (not shown) that selects one of the two cathode drivers 50, 51 according to the load signal (HD-LOAD), and activates the selected cathode driver in synchronization with the strobe signal (HD-STB-N).

FIG. 12 shows only part of the internal structure of the LED array chip 3 and LED driver IC 4. In all, there are one hundred ninety-two LEDs in each LED array chip 3. The dots printed by, for example, the rightmost LED array chip 3 in the LED head 2 are numbered in order from dot one to one hundred ninety-two, so that dot one is printed by the rightmost LED 45, and dot one hundred ninety-two is printed by the leftmost LED 38. This numbering is also applied to the memory circuits (M$_1$ to M$_{192}$) in the LED driver IC 4. The flip-flops (FF$_1$ to FF$_{96}$), latches (LT$_1$ to LT$_{96}$), multiplexers (MUX$_1$ to MUX$_{96}$), anode drivers (DRVA$_1$ to DRVA$_{96}$), and anode output terminals (A1 to A96) are similarly numbered from right to left, but there are only ninety-six of each of these elements in each LED driver IC 4.

Next, the operation of the first embodiment will be described.

Before printing begins, compensation data are loaded into the memory circuits 14–21. The compensation data are transferred from a non-volatile memory (not shown) in the printing control unit 1 via the HD-DATA signal line to the shift register comprising the flip-flops 6–9 in each LED driver IC 4. First, for example, the most significant bits (b4) of compensation data for the odd-numbered LEDs are transferred into these flip-flops 6–9, latched in the latches 10–13, and written into the odd-numbered memory circuits 15, 17, 19, 21 in synchronization with a memory write signal not shown in the drawings. Next, for example, the most significant bits (b4) of compensation data for the even-numbered LEDs are transferred, latched and written into the even-numbered memory circuits 14, 16, 18, 20 in synchronization with a different memory write signal. The other bits of compensation data are then stored by similar transfer-latch-write operations. In all, ten such operations are required. These operations are carried out, for example, when the printer's power is turned on.

At the completion of these operations, memory circuit 14 (M$_{192}$) stores five bits of compensation data for LED 38 (dot 192), memory circuit 15 (M$_{191}$) stores five bits of compensation data for LED 39 (dot 191), and so on through memory circuit 21 (M$_1$), which stores five bits of compensation data for LED 45 (dot 1). The compensation data adjust the amount of energy that will be supplied to the corresponding LED when it is driven.

Figure 13:
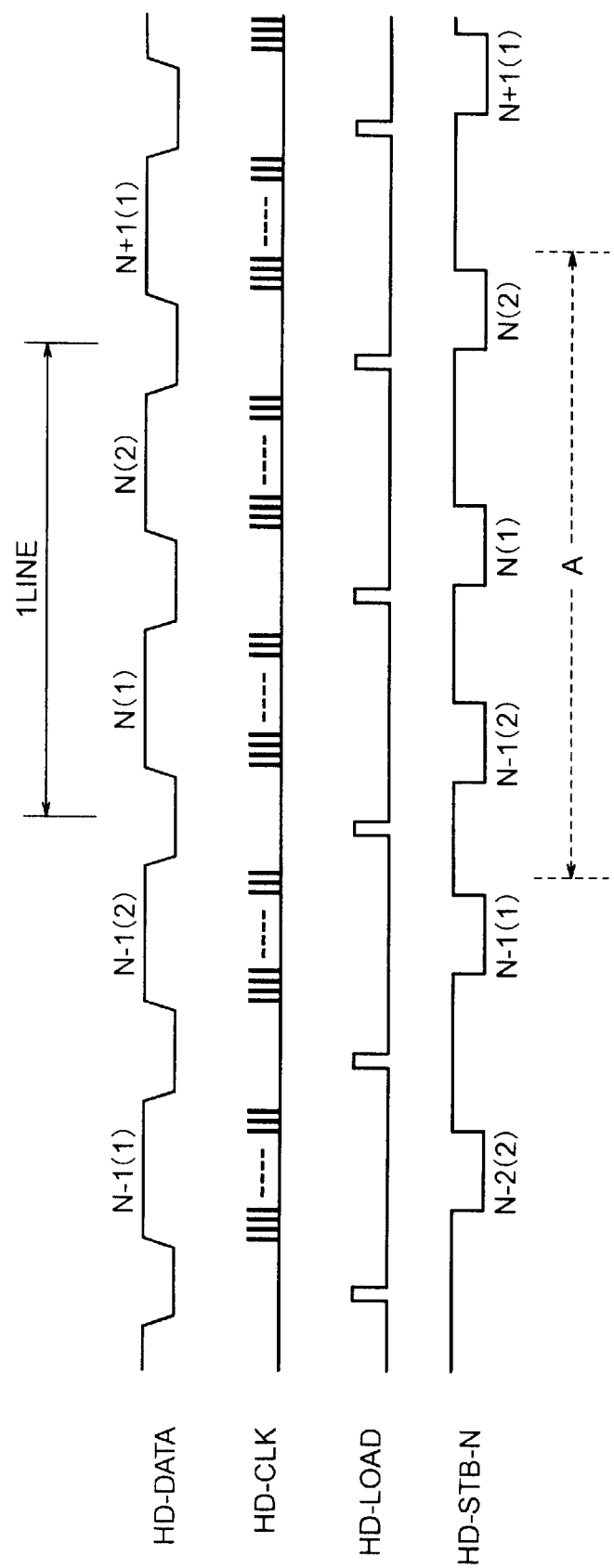
FIGS. 13, 14, and 15 are timing diagrams illustrating the operation of the first embodiment and a second embodiment.

FIG. 13 illustrates the sequence of operations for printing a pair of dot lines (line N and the preceding line N–1). In each dot line, first the odd-numbered dots are printed, then the even-numbered dots are printed. In line N, for example, the data N(1) for the odd-numbered dots are sent from the printing control unit 1 to the LED head 2 on the HD-DATA signal line in synchronization with the clock signal (HD-CLK) and shifted through the shift register comprising the flip-flops 6–9 in each LED driver IC 4. When all these data have been shifted into the shift register, the load-signal (HD-LOAD)-is activated (driven high), and the data are latched by the latches 10–13. At this point the odd-numbered memory circuits 15, 17, 19, 21 and cathode drivers 51 (DRVK$_{ODD}$) are selected by the multiplexers 22–25 and cathode driver ICs 5. Next, the strobe signal (HD-STB-N) is activated (driven low), activating the anode drivers 26, 27, 28, 29 and cathode drivers 51, which combine to drive the odd-numbered LEDs according to the data supplied from the latches and memory circuits.

As the odd-numbered LEDs are being driven, input of the data N(2) for the even-numbered dots in line N begins Partway through the input of these data, the strobe signal (HD-STB-N) is inactivated (driven high) and the driving of the odd-numbered LEDs ends. When all the even-numbered dot data have been placed in the shift register, the load signal (HD-LOAD) is activated again, causing the latches to latch the data; the multiplexers to select the even-numbered memory circuits 14, 16, 18, 20; and the cathode driver ICs 5 to select the even cathode drivers 50 (DRVK$_{EVEN}$). Next, the strobe signal (HD-STB-N) activates the anode drivers 26, 27, 28, 29 and the even cathode drivers 50, which combine to drive the even-numbered LEDs according to the data supplied from the latches and memory circuits. The entire operation of driving the LEDs for line N extends over the time interval A.

Figure 14:
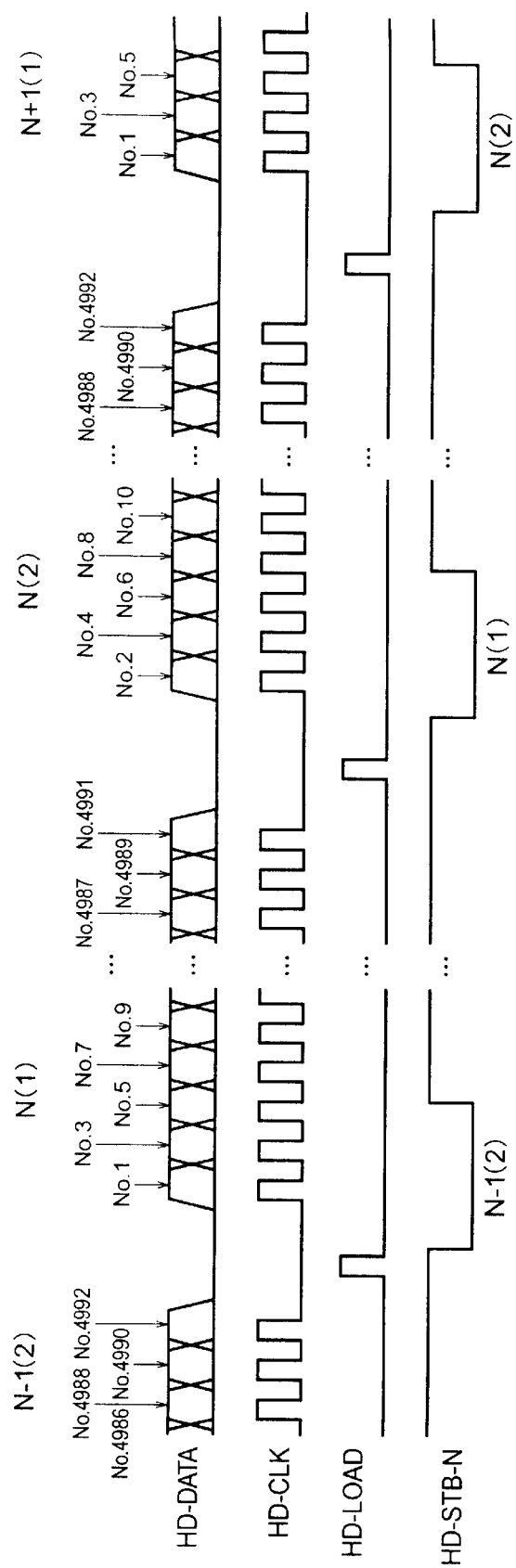

FIG. 14 illustrates the operations in this time interval in more detail. The odd-numbered dot data for line N comprise data for dots No. 1, No. 3, No. 5, . . . , No. 4991, as indicated at the top of the drawing. The dot data are received on the falling edges of the clock signal (HD-CLK). The clock signal is stopped before the load signal (HD-LOAD) is activated and is started again after the load signal is inactivated. Each time the load signal (HD-LOAD) is activated, the multiplexers 22–25 switch from selecting one set of memory circuits (even or odd) to selecting the other set of memory circuits (odd or even), and the cathode driver ICs switch between the even and odd cathode drivers.

During the interval when the strobe signal (HD-STB-N) is active, the anode drivers 26–29 operate as follows. If the data signal received from the corresponding latch is active, the anode driver supplies current to the corresponding anode output pad, driving this output pad to the high (VDD) level. The amount of current supplied depends on the five bits of compensation data stored in the memory circuit selected by the multiplexer. If the data signal received from the latch is inactive, no current is supplied to the anode output pad, which remains at the low (ground) level.

The cathode driver ICs 5 also receive the load signal (HD-LOAD) and strobe signal (HD-STB-N). As explained above, one of the two cathode drivers 50, 51 in each cathode driver IC 5 is selected according to the load signal (HD-LOAD). The selected cathode driver drives the corresponding cathode output pad 48 or 49 to the low (ground) level while the strobe signal (HD-STB-N) is active, and holds this cathode output pad at the high (V$_{DD}$) level while the strobe signal is inactive. The non-selected cathode driver holds its cathode output pad at the high (V$_{DD}$) level at all times. The two cathode output pads 48, 49 are thus never driven low simultaneously.

An LED is driven if the anode input pad to which it is connected is at the high (V$_{DD}$) level and the cathode input pad to which it is connected as at the low (ground) level. for example, LED 38 is driven if anode output pad 30 (and thus anode input pad 34) is high and cathode output pad 48 (and thus cathode input pad 46) is low. As another example, if anode output pads 30, 31, 32, 33 are all driven high and cathode output pad 48 is low (cathode output pad 49 thus being high), even-numbered LEDs 38, 40, 42, 44 are driven and simultaneously emit light, while odd-numbered LEDs 39, 41, 43, 45 remain dark. Similarly, if anode output pads 30, 31, 32, 33 are all driven high and cathode output pad 49 is driven low (cathode output pad 48 thus being high), odd-numbered LEDs 39, 41, 43, 45 are driven and emit light, while even-numbered LEDs 38, 40, 42, 44 remain dark.

Figure 15:
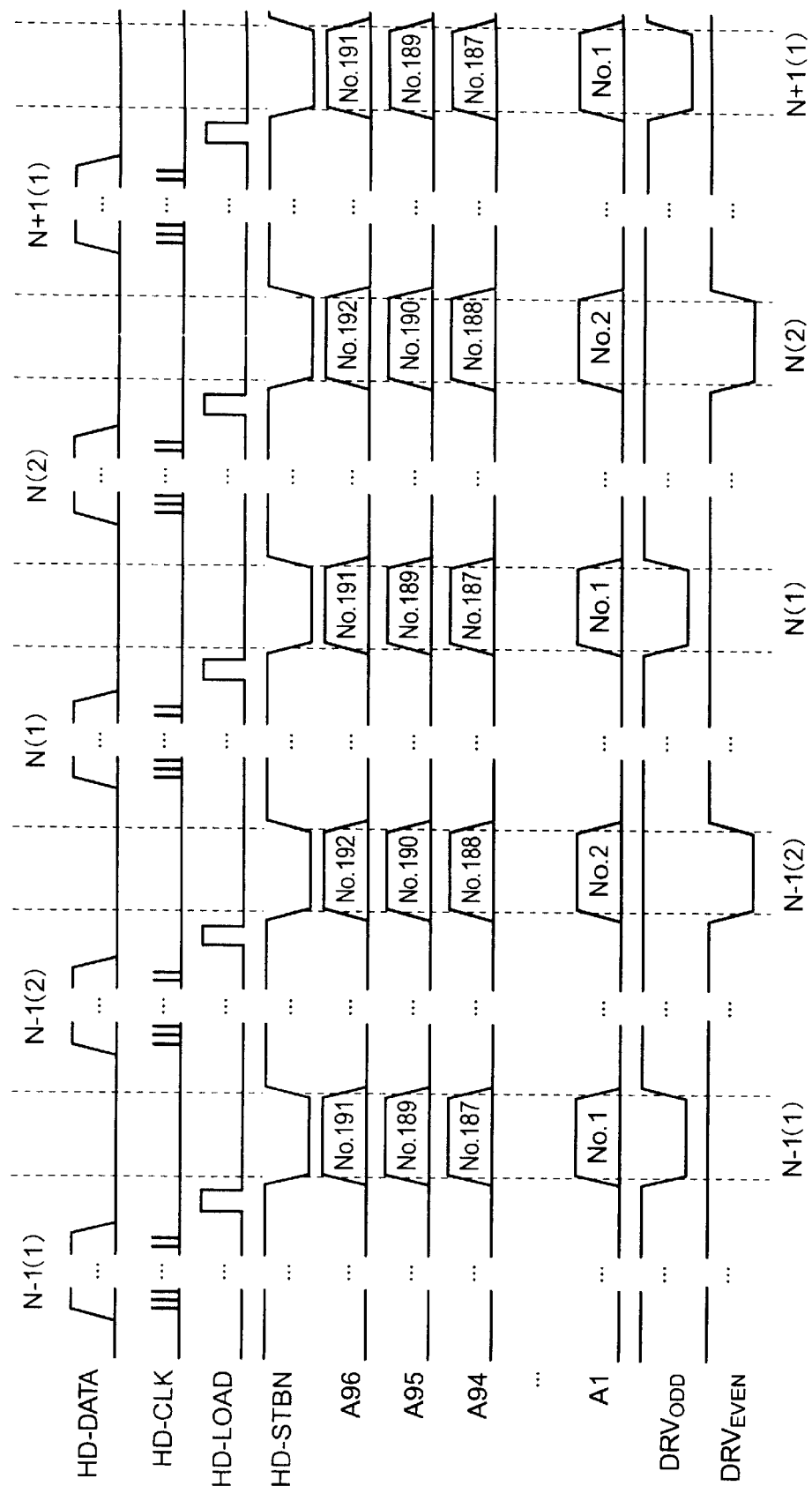

Referring to FIG. 15, after the data for the odd-numbered dots in line N−1 have been input and latched, the output of cathode driver 51 ($DRV_{ODD}$) goes low and the anode output pads 30–33 (A96-A1) are driven high or low by the corresponding anode drivers 26–29, driving the odd-numbered LEDs according to the latched dot data and the compensation data stored in the odd-numbered memory circuits. Next, the data for the even-numbered dots in line N−1 are input and latched, the output of cathode driver 50 ($DRV_{EVEN}$) goes low, and the anode output pads 30–33 (A96-A1) are again driven high or low by the anode drivers 26–29, driving the even-numbered LEDs according to the latched dot data and the compensation data stored in the even-numbered memory circuits. The dot data for line N are then loaded and the LEDs are driven in the same way. Repetitions of these operations print successive lines of dots constituting an entire page.

As a specific example, the sequence for printing odd-numbered dots in line N−1 and line N will be described, on the assumption that '1' designates a printed (black) dot and '0' a non-printed (white) dot.

First, all '1' data are input to the shift register and loaded into the latches. When the load signal (HD-LOAD) goes high for this latching operation, the multiplexers select the odd-numbered memory circuits and the cathode driver ICs 5 select cathode driver 51. When the strobe signal (HD-STB-N) is activated and the output of this cathode driver ($DRV_{ODD}$) goes low, the outputs of all of the anode drivers 26–29 go high, all of the anode output pads 30–33 (A96-A1) go high, and all of the odd-numbered LEDs are driven.

Next, all '0' data are input to the shift register and loaded into the latches. When the load signal goes high for this latching operation, the multiplexers switch to select the even-numbered memory circuits and the cathode driver ICs select cathode driver 50. When the strobe signal is activated and the output of this cathode driver ($DRV_{EVEN}$) goes low, all of the anode output pads 30–33 (A96-A1) remain low, because none of the anode drivers receives active ('1') latched dot data, so none of the even-numbered LEDs are driven.

Next, all '1' data are input and loaded into the latches. When the load signal goes high this time, the multiplexers revert to selection of the odd-numbered memory circuits and the cathode driver ICs 5 to selection of the odd cathode drivers 51. When the strobe signal is activated and the outputs of the odd cathode drivers 51 go low, all of the anode output pads 30–33 (A96-A1) go high and all of the odd-numbered LEDs are driven again.

Next, all '0' data are input and loaded into the latches. When the load signal goes high, the multiplexers select the even-numbered memory circuits again and the cathode driver ICs 5 select the even cathode drivers 50, but the outputs of all of the anode output pads 30–33 (A96-A1) remain low and none of the even-numbered LEDs are driven.

As described above, the first embodiment enables dynamic driving of the LEDs without requiring compensation data to be transferred together with the dot data for each line. Printing can therefore proceed more quickly than would be possible with a conventional dynamically driven print head that did not store compensation data in the LED driver ICs.

Conversely, in an LED driver IC storing compensation data, the first embodiment enables the spacing between adjacent anode output pads (1/300 inch in FIG. 12) to be greater than the spacing between adjacent memory circuits (1/600 inch in FIG. 12). Since the anode output pads require wire bonding while the memory circuits do not, this arrangement facilitates manufacturing while continuing to take advantage of the capability of the ICs for high-density data storage.

Next, a second embodiment will be described. The second embodiment provides the same effect as the first embodiment, but at a lower cost.

Figure 5:
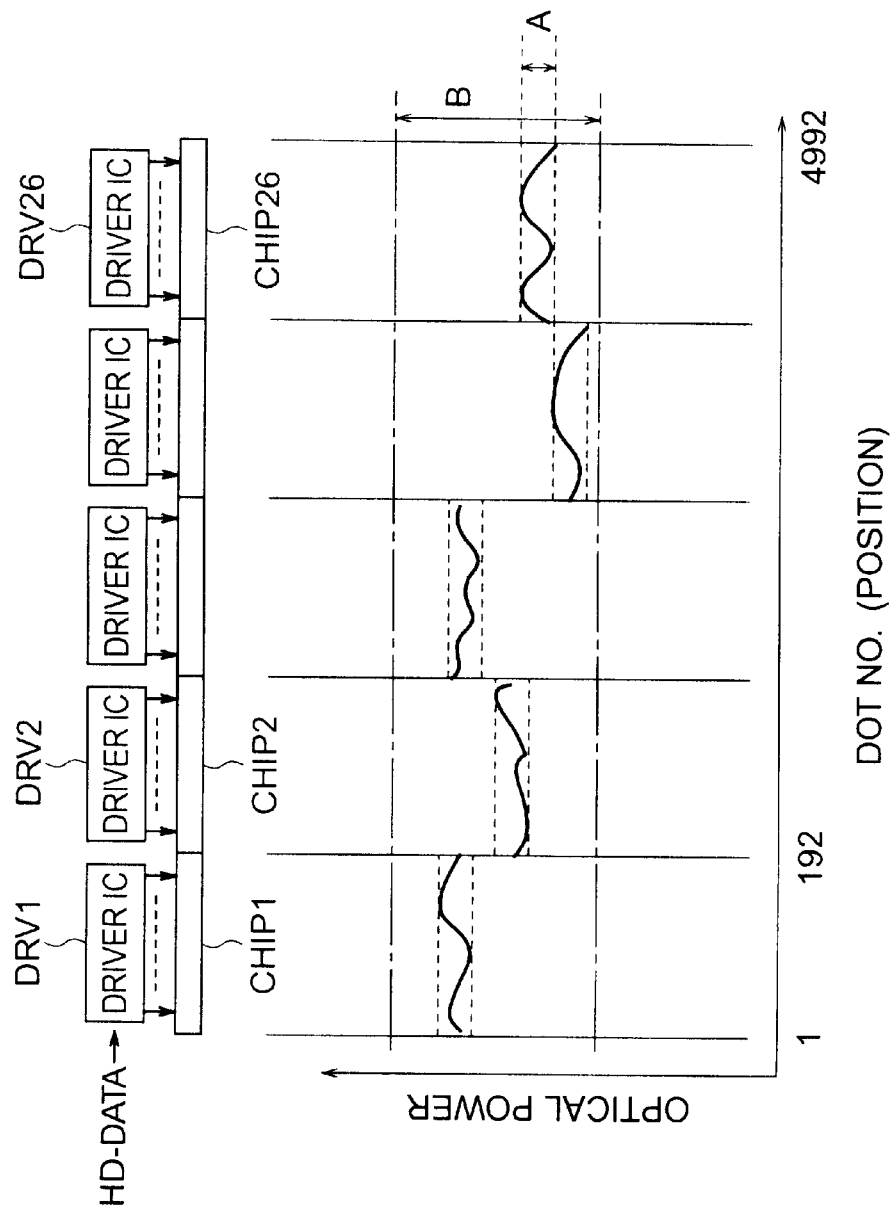
FIG. 5 is a graph illustrating dot-to-dot and chip-to-chip variations in LED output an LED head.
Figure 6:
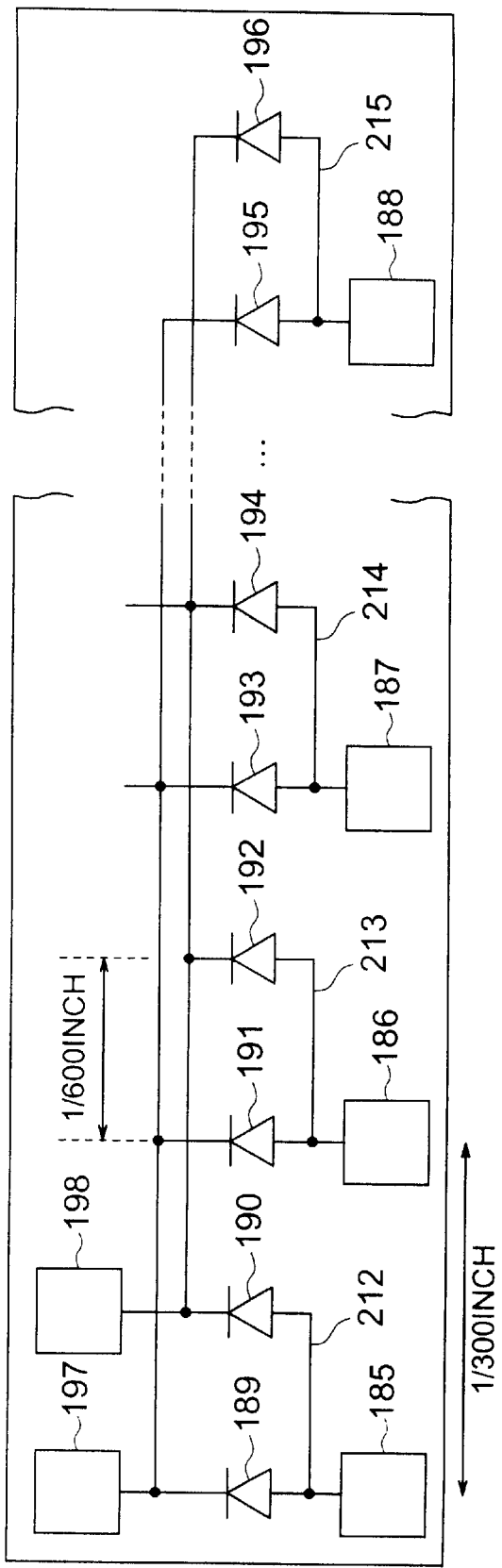
FIG. 6 is a diagram showing the structure of an LED array chip in an LED head in a conventional electrophotographic printer that employs dynamic driving.
Figure 7:
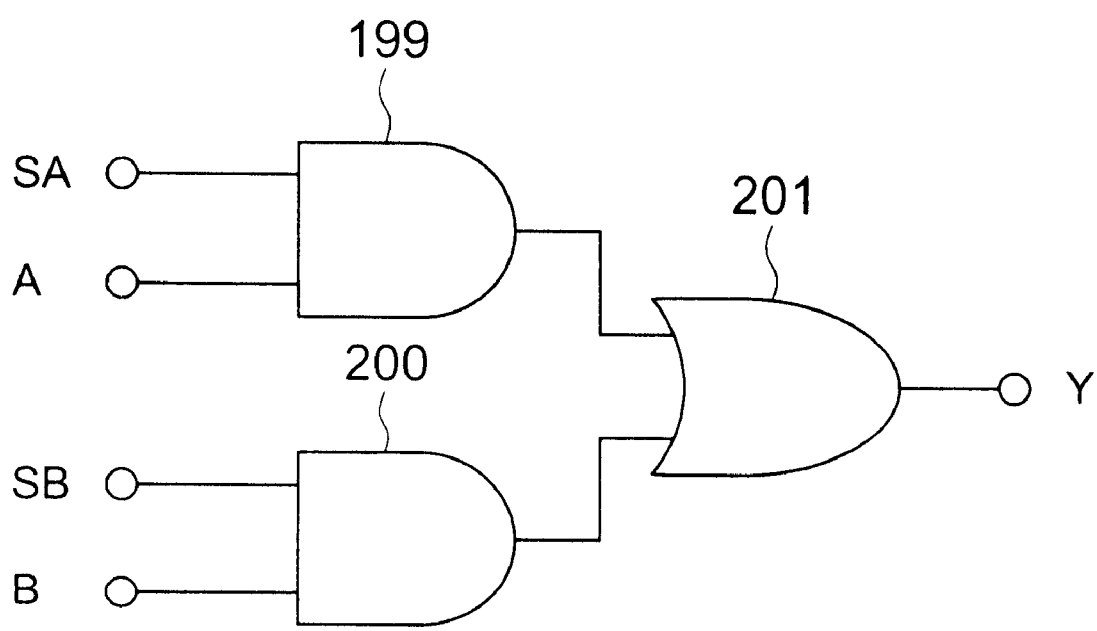
FIG. 7 is a circuit diagram of a conventional multiplexer.
Figure 8:
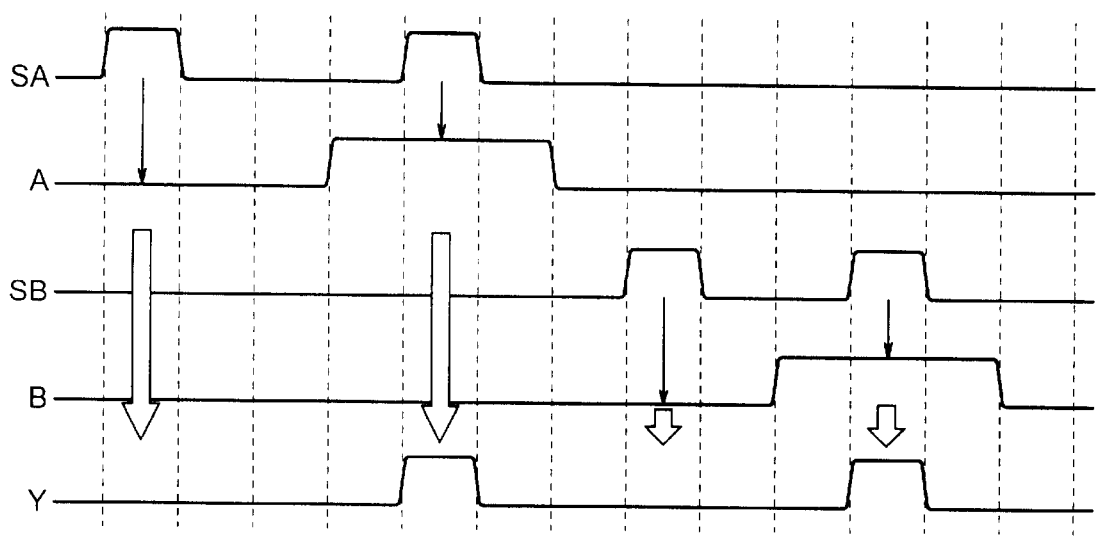
FIG. 8 is a timing diagram illustrating the operation of the multiplexer in FIG. 7.

As was shown in FIG. 5, the output variations from one LED array chip to another LED array chip may be fairly large, but the variations from one LED to another LED within the same LED array chip are comparatively small; the output usually varies gradually and continuously from one LED to the next. As a result, the compensation data for mutually adjacent LEDs usually differ by no more than one least significant bit. The second embodiment exploits this property by storing the upper four bits of compensation data for two mutually adjacent LEDs in a single four-bit memory circuit, and storing only the least significant bit separately, in two one-bit memory cells.

Figure 16:
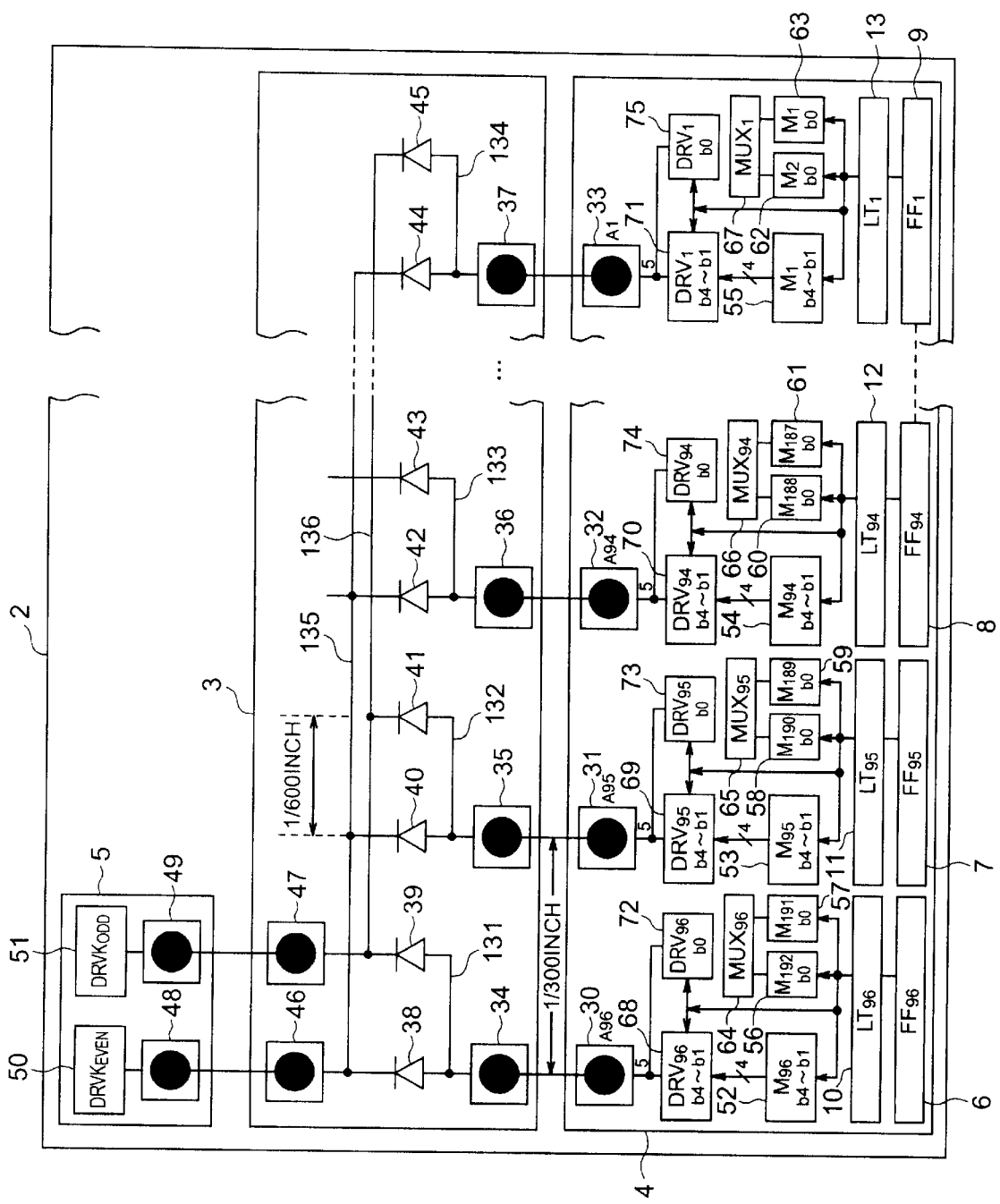
FIG. 16 illustrates the circuit structure of an LED head according to the second embodiment.

Referring to FIG. 16, the second embodiment replaces the memory circuits of the first embodiment with four-bit memory circuits 52, 53, 54, 55 storing common compensation data for a pair of LEDs, and one-bit memory cells 56, 57, 58, 59, 60, 61, 62, 63 storing the least significant bits of the compensation data as individual compensation data for individual LEDs. The multiplexers of the first embodiment are replaced with multiplexers 64, 65, 66, 67 that select the even- or odd-numbered one-bit memory cells. The anode drivers of the first embodiment are replaced by driver circuits 68, 69, 70, 71 connected to respective memory circuits 52, 53, 54, 55, and driver circuits 72, 73, 74, 75 connected to respective multiplexers 64, 65, 66, 67. Each anode output pad is connected to two anode drivers: anode output pad 30 to anode drivers 68 and 72, anode output pad 31 to anode drivers 69 and 73, anode output pad 32 to anode drivers 70 and 74, and anode output pad 33 to anode drivers 71 and 75.

The outputs of the latches 10, 11, 12, 13 are supplied to the corresponding memory circuits, memory cells, and anode drivers. For example, the output of latch 10 is supplied to memory circuit 52, memory cells 56, 57, and anode drivers 68, 72.

The flip-flops 6, 7, 8, 9 and the component elements of the LED array chip 3 and cathode driver IC 5 are identical to the corresponding elements in the first embodiment (FIG. 12).

The two anode drivers in each pair are shown separately merely for convenience of description; their combined internal circuit configuration is equivalent to the internal circuit configuration of the single corresponding anode driver in the first embodiment. For example, anode drivers 68 and 72 are together equivalent to anode driver 26 in the first embodiment.

Compared with the first embodiment, the second embodiment stores only six bits (4+1+1) of compensation data for each pair of adjacent LEDs, whereas the first embodiment stored ten bits (5+5). Furthermore, the second embodiment requires only multiplexers with one-bit data paths, whereas the first embodiment required multiplexers with five-bit-wide data paths.

Next, the operation of the second embodiment will be described.

Before printing begins, the compensation data are stored into the memory circuits and cells. First, for example, the four upper bits of common compensation data are stored in the memory circuits 52–55, one bit at a time, by four transfer-latch-write operations, as described in the first embodiment. Next, the least significant bits of compensation data for the odd-numbered LEDs are stored in memory cells 57, 59, 61, 63 by one transfer-latch-write operation; then the least significant bits of compensation data for the even-numbered LEDs are written in memory cells 58, 60, 62, 64 by another transfer-latch-write operation.

In all, six transfer-load-write operations are required, instead of the ten operations required in the first embodiment, so the storing is completed more quickly than in the first embodiment and the printer is ready to print more promptly after its power is switched on.

Printing is performed in substantially the same way as in the first embodiment, as illustrated in FIGS. 13, 14, and 15. The following description will focus on those aspects of the printing operation that differ from the first embodiment.

As shown in FIGS. 13 and 14, each dot line is printed in two parts: first the odd-numbered dots are printed; then the even-numbered dots are printed. When the load signal (HD-LOAD) is activated to latch the odd-numbered dot data, the multiplexers 64–67 in each LED driver IC 4 select the odd-numbered memory cells 57, 59, 61, 63. When the load signal (HD-LOAD) is activated to latch the even-numbered dot data, the multiplexers 64–67 select the even-numbered memory cells 56, 58, 60, 62.

During the intervals when the strobe signal (HD-STB-N) is active, the anode drivers 68–75 drive the anode output pads 30–33 according to the latched dot data. If the data signal received from latch 10 is active, for example, anode drivers 68 and 72 both supply current to anode output pad 30, driving this output pad to the high logic level. The amount of current supplied by anode driver 68 depends on the four bits of common compensation data stored in memory circuit 52. The amount of current supplied by anode driver 72 depends on the single bit of individual compensation data supplied from memory cell 56 or memory cell 57, as selected by multiplexer 64. If the data signal received from latch 10 is inactive, no current is supplied from either anode driver 68 or 72, and anode output pad 30 remains at the low logic level.

Referring to FIG. 15, after the data for the odd-numbered dots in line N–1 (or line N) have been input and latched, the output of cathode driver 51 ($DRV_{ODD}$) goes low and the odd-numbered LEDs are driven according to the latched dot data. The driving current is adjusted according to the common compensation data stored in the memory circuits 52–55 and the individual compensation data stored in the odd-numbered memory cells 57, 59, 61, 63. Next, the data for the even-numbered dots in line N–1 (or line N) are input and latched, the output of cathode driver 50 ($DRV_{EVEN}$) goes low, and the even-numbered LEDs are driven according to the latched dot data. The driving current is now adjusted according to the common compensation data stored in the memory circuits 52–55 and the individual compensation data stored in the even-numbered memory cells 56, 58, 60, 62. Repetitions of these operations print dot data for an entire page.

Memory circuit 52 ($M_{96}$) in FIG. 16 thus stores the upper four bits of compensation data for both LED 38 (dot No. 192) and LED 39 (dot No. 191). Similarly, memory circuit 53 ($M_{95}$) stores the upper four bits of compensation data for both LED 40 (dot No. 190) and LED 41 (dot No. 189); memory circuit 54 ($M_{94}$) stores the upper four bits of compensation data for both LED 42 (dot No. 188) and LED 43 (dot No. 187); and memory circuit 55 ($M_1$) stores the upper four bits of compensation data for both LED 44 (dot No. 2) and LED 45 (dot No. 1). These bits of compensation data are supplied to the corresponding anode drivers 68–71 each time the load signal (HD-LOAD) is activated.

Memory cell 56 ($M_{192}$) stores the least significant bit of compensation data for LED 38 (dot No. 192), memory cell 57 ($M_{191}$) stores the least significant bit of compensation data for LED 39 (dot No. 191), and so on through memory cell 62 ($M_2$), which stores the least significant bit of compensation data for LED 44 (dot No. 2) and memory cell 63 ($M_1$), which stores the least significant bit of compensation data for LED 45 (dot No. 1). The multiplexers 64–67 select these bits of individual compensation data according to the load signal (HD-LOAD), switching between even-numbered memory cells and odd-numbered memory cells each time the load signal is activated.

The second embodiment speeds up printing operations in the same way as the first embodiment, by obviating the need to transfer compensation data together with the print data for each line. In addition, the second embodiment speeds up the transfer of compensation data from the printing control unit 1 to the LED head 2, because there are fewer bits of data to be transferred. The reduced amount of compensation data also improves the reliability of the compensation data, since there is less opportunity for the compensation data to be corrupted by electrical noise during transfer from the printing control unit 1, or while stored in the LED head 2

The sharing of the four upper bits of compensation data leads to some loss of compensation accuracy, as compared with the first embodiment, but the second embodiment is still able to store compensation data that vary gradually and continuously from one dot to the next, in the way that the LED output characteristics themselves usually vary, so the compensation error remains small and is ordinarily not noticeable.

By reducing the amount of compensation data to be stored and the bit width of the multiplexers, the second embodiment also reduces the chip size of the LED driver ICs 4. More LED driver IC chips can then be fabricated from a single semiconductor wafer, reducing the cost of the LED driver ICs 4. Similarly, the cost of the printing control unit 1 is reduced, since it requires less non-volatile memory to store the compensation data. The overall cost of the print head is therefore reduced, even while its speed and reliability are increased.

In a variation of the second embodiment, the number of shared upper bits is reduced and the number of individually stored lower bits is increased, providing similar effects to a lesser degree, but with less loss of compensation accuracy.

Next, a third embodiment will be described. The third embodiment is similar to the preceding embodiments, but uses n:1 multiplexing, where n is an integer greater than two. In the following description, n will be equal to four. Two versions of the third embodiment will be described, one based on the first embodiment, the other based on the second embodiment.

Figure 17:
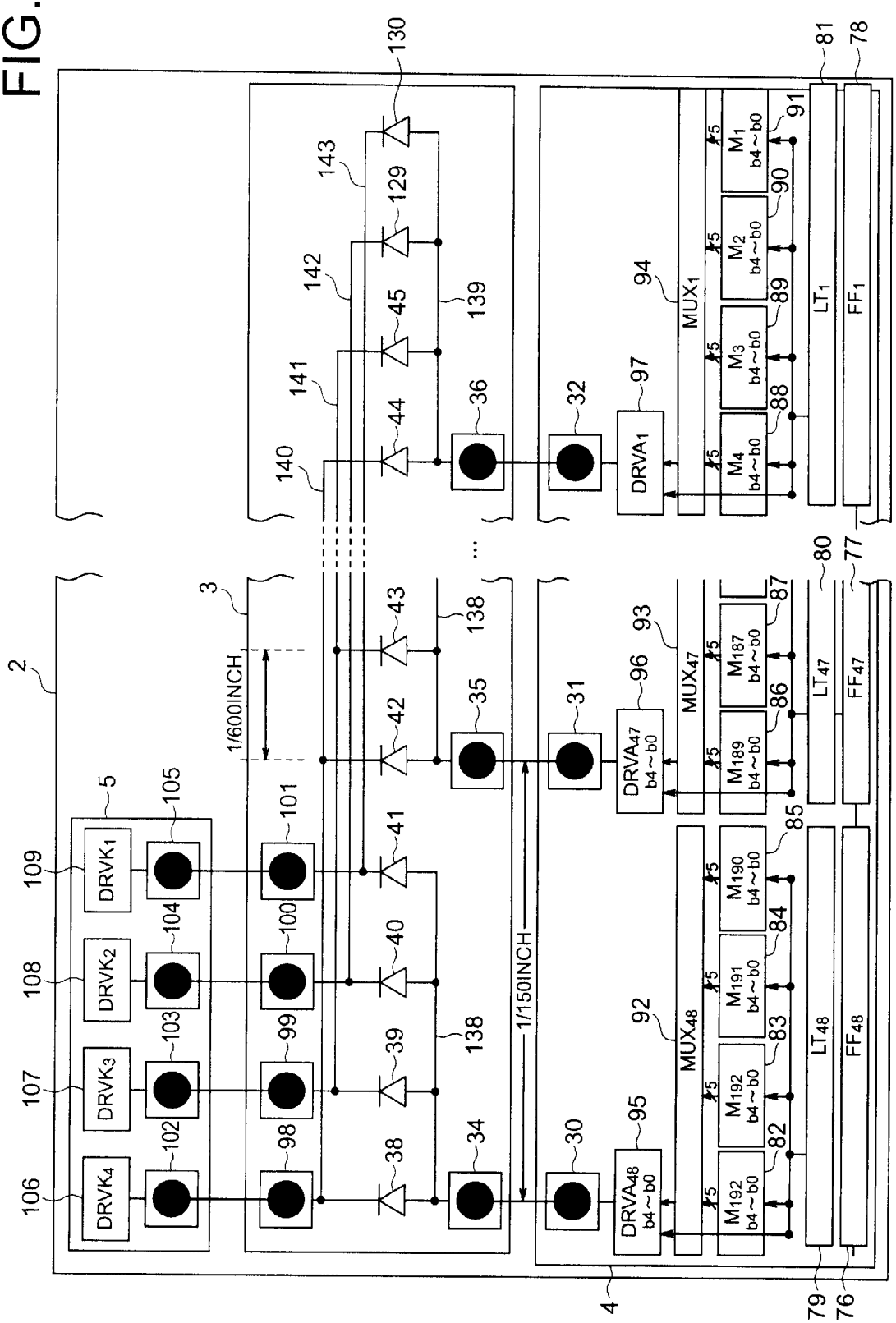
FIG. 17 illustrates the circuit structure of an LED head according to a first version of a third embodiment.

FIG. 17 shows part of one LED array chip 3, part of one LED driver IC 4, and one cathode driver IC 5 in an LED head 2 according to the first version of the third embodiment. The LED driver IC 4 has a shift register comprising flip-flops 76, 77, 78, which provide data to latches 79, 80, 81. These elements function as described in the first embodiment.

The LED driver IC 4 has memory circuits 82, 83, 84, 85, 86, 87, 88, 89, 90, 91 (also denoted $M_1$–$M_{192}$), each storing five bits of compensation data (b0–b4) as in the first embodiment. Each latch supplies data to four of these memory circuits: for example, latch 76 supplies data to memory circuits 82–85; latch 78 supplies data to memory circuits 88–91.

The LED driver IC 4 also has multiplexers 92, 93, 94, each receiving five-bit parallel data from each of four memory circuits. For example, multiplexer 92 receives five-bit parallel data from each of memory circuits 82–85; multiplexer 94 receives five-bit parallel data from each of memory circuits 88–91. The multiplexers 92–94 send compensation data to corresponding anode drivers 95–97, which operate as in the first embodiment, supplying current to corresponding anode output pads 30–32.

The number of flip-flops, latches, multiplexers, anode drivers, and anode output pads is only half as great as in the first embodiment: there are forty-eight flip-flops ($FF_1FF_{48}$), forty-eight latches ($LT_1$–$LT_{48}$), forty-eight multiplexers ($MUX_1$–$MUX_{48}$), forty-eight anode drivers ($DRVA_1$–$DRVA_{48}$), and forty-eight anode output pads per LED driver IC 4.

In the LED array chip 3, each anode input pad is coupled to four LEDs. For example, anode input pad 34 is coupled by anode wiring 137 to LEDs 38, 39, 40, 41; anode input pad 35 is coupled by anode wiring 138 to LEDs 43, 43 and two other LEDs (not visible); anode input pad 36 is coupled by anode wiring 139 to LEDs 44, 45, 129, 130. The LEDs are coupled to four cathode input pads 98, 99, 100, 101. Cathode input pad 98 is coupled by cathode wiring 140 to LEDs 38, 42, and every fourth subsequent LED, up to LED 44. Similarly, cathode input pad 99 is coupled by cathode wiring 141 to LEDs 39, 43, and every fourth subsequent LED up to LED 45; cathode input pad 100 is coupled by cathode wiring 142 to LED 40 and every fourth subsequent LED up to LED 129; and cathode input pad 101 is coupled by cathode wiring 143 to LED 41 and every fourth subsequent LED up to LED 130.

The cathode driver IC 5 has four cathode output pads 102, 103, 104, 105 coupled to respective cathode drivers 106, 107, 108, 109. Cathode output pad 102 is coupled by a bonding wire to cathode input pad 98 in the LED array chip 3. Similarly, cathode output pad 103 is coupled to cathode input pad 99, cathode output pad 104 to cathode input pad 100, and cathode output pad 105 to cathode input pad 101. The cathode drivers 106, 107, 108, 109 are also denoted $DRVK_4$, $DRVK_3$, $DRVK_2$, $DRVK_1$, respectively.

Each memory circuit in FIG. 17 stores compensation data for one LED. For example, memory circuit 82 stores compensation data for LED 38, memory circuit 83 stores compensation data for LED 39, and so on through memory circuit 91, which stores compensation data for LED 130.

Figure 18:
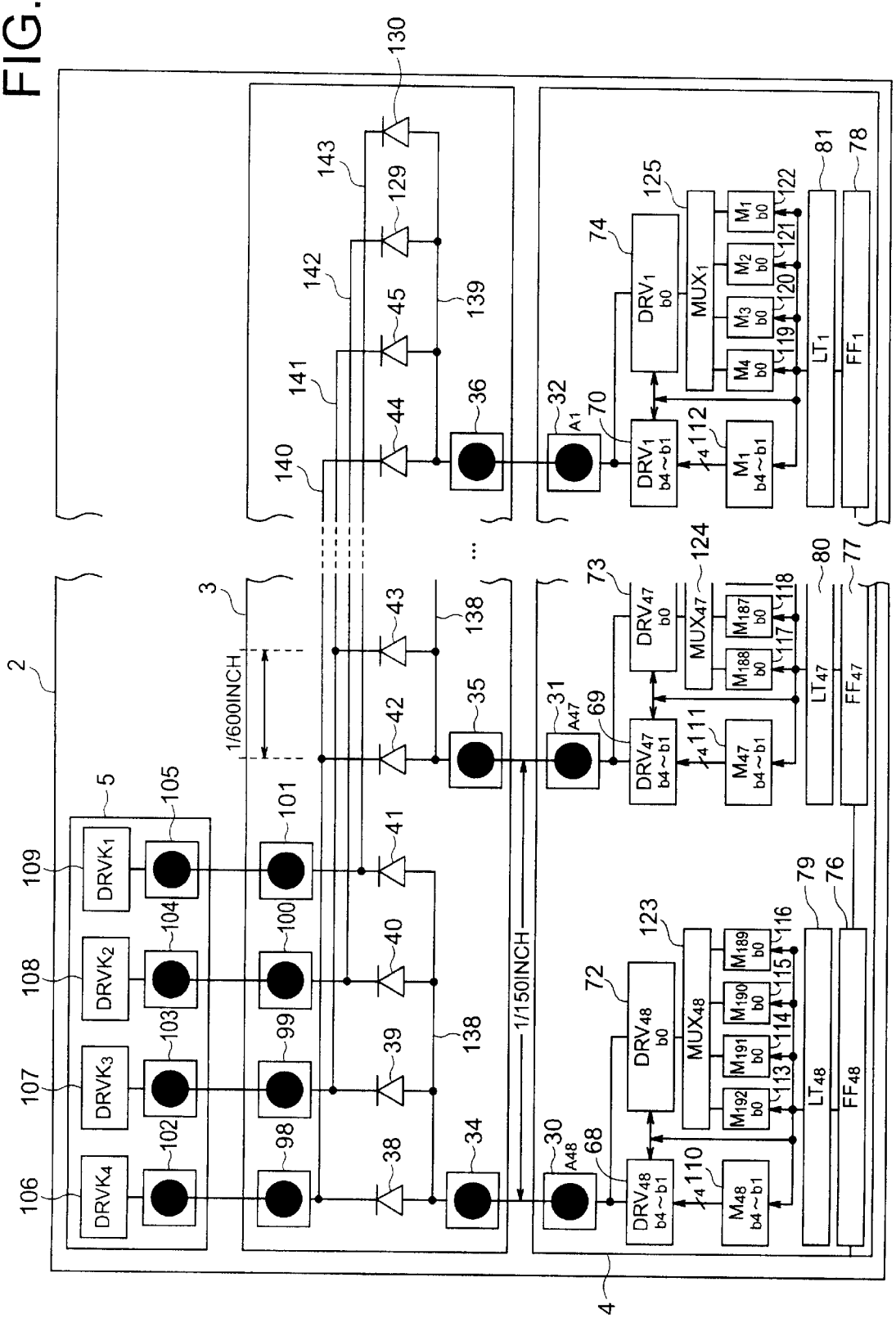
FIG. 18 illustrates the circuit structure of an LED head according to a second version of the third embodiment.

FIG. 18 shows part of one LED array chip 3, part of one LED driver IC 4, and one cathode driver IC 5 in an LED head 2 according to the second version of the third embodiment. This LED driver IC 4 has flip-flops 76–78 and latches 79–81 as in FIG. 17; memory circuits 110, 111, 112, each storing four comparatively significant bits of compensation data (b1-b4) as in the second embodiment; memory cells 113, 114, 115, 116, 117, 118, 119, 120, 121, 122, each storing one least significant bit of compensation data (b0) as in the second embodiment; and multiplexers 123, 124, 125, each receiving input from four memory cells. For example, multiplexer 123 receives one bit from each of memory cells 113–116, and multiplexer 125 receives one bit from each of memory cells 119–122. The memory circuits 110, 111, 112 supply their stored compensation data to anode drivers 68, 69, 70. The multiplexers 126–128 supply compensation data to anode drivers 72, 73, 74. These anode drivers operate as in the second embodiment, supplying current to corresponding anode output pads 30–32. The number of flip-flops, latches, multiplexers, anode drivers, and anode output pads is only half as great as in the second embodiment: for example, there are only forty-eight pairs of anode drivers ($DRV_1$–$DRV_{48}$) per LED driver IC 4.

The LED array chip 3 and cathode driver IC 5 have the same internal structure as in FIG. 17.

The four bits of compensation data stored in each memory circuit in FIG. 18 are shared by four LEDs. For example, LEDs 38, 39, 40, 41 are all driven by anode driver 68 according to the compensation data stored in memory circuit 110. The memory cells store the least significant bits (b0) of compensation data for individual LEDs. For example, anode driver 72 drives LED 38 according to the bit stored in memory cell 113, LED 39 according to the bit stored in memory cell 114, LED 40 according to the bit stored in memory cell 115, and LED 41 according to the bit stored in memory cell 116. Needless to say, drivers 68, 72 drive these LEDs only if latch 79 outputs active ('1') data, indicating that a dot should be printed.

Figure 19:
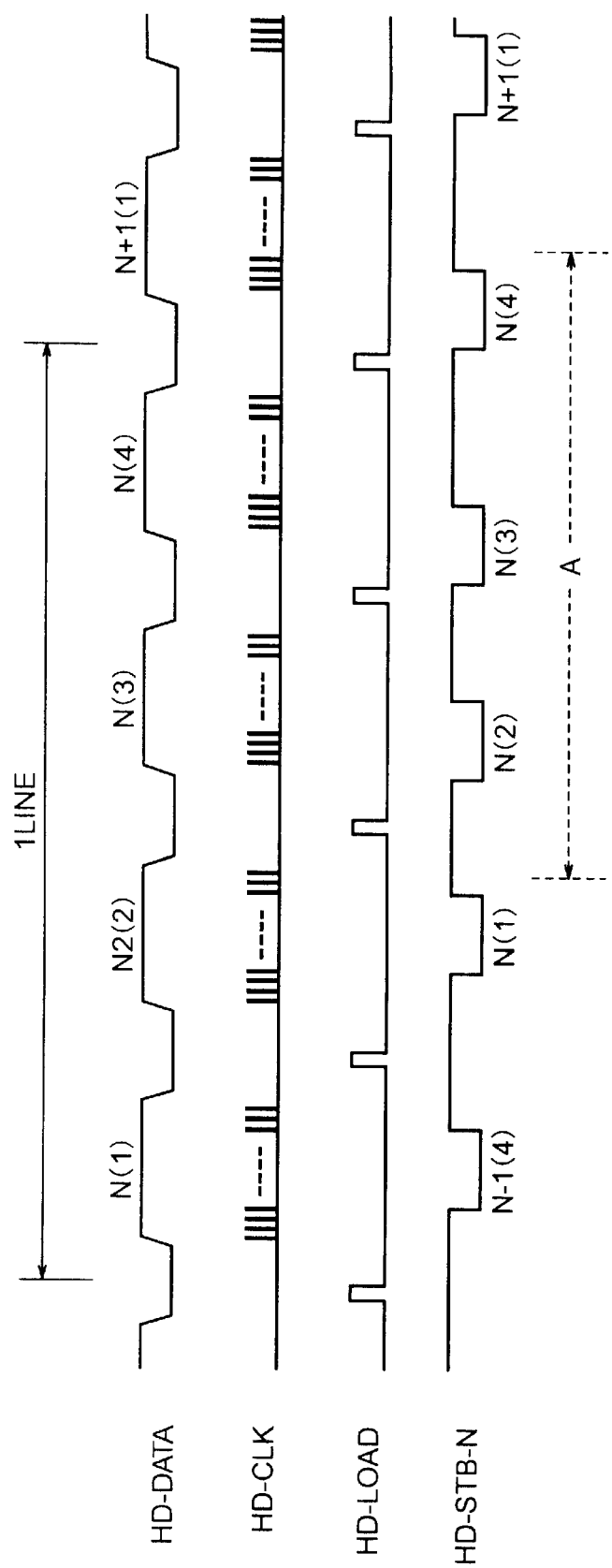
FIGS. 19, 20, and 21 are timing diagrams illustrating the operation of the third embodiment.
Figure 20:
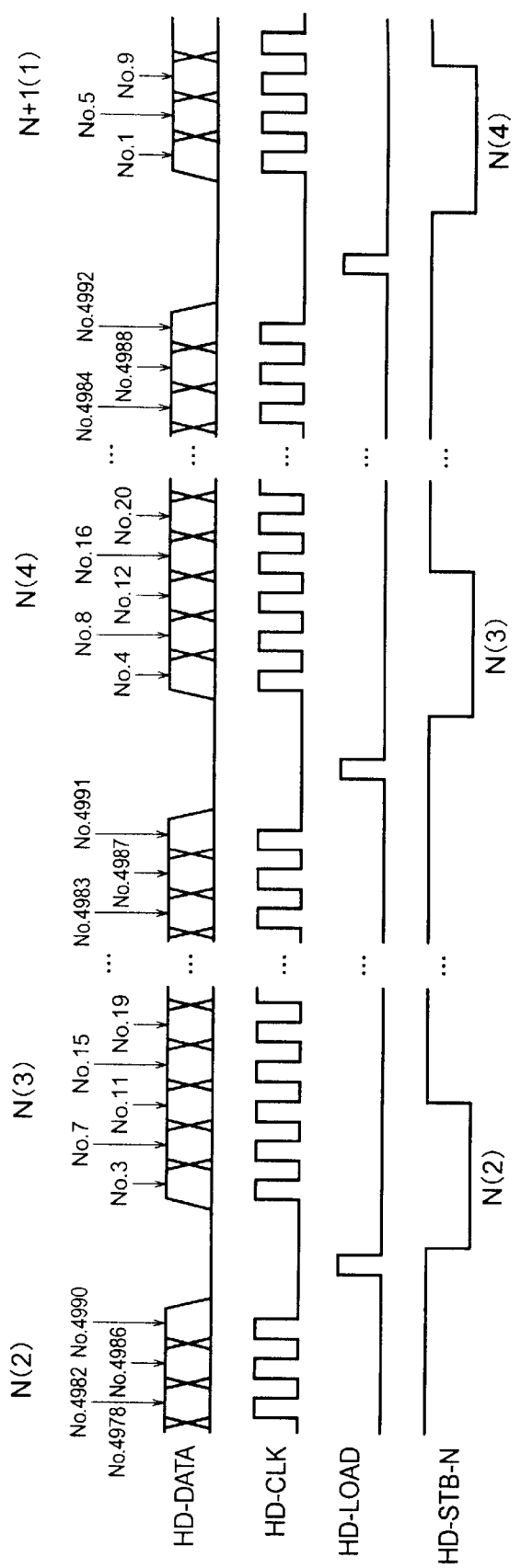
Figure 21:
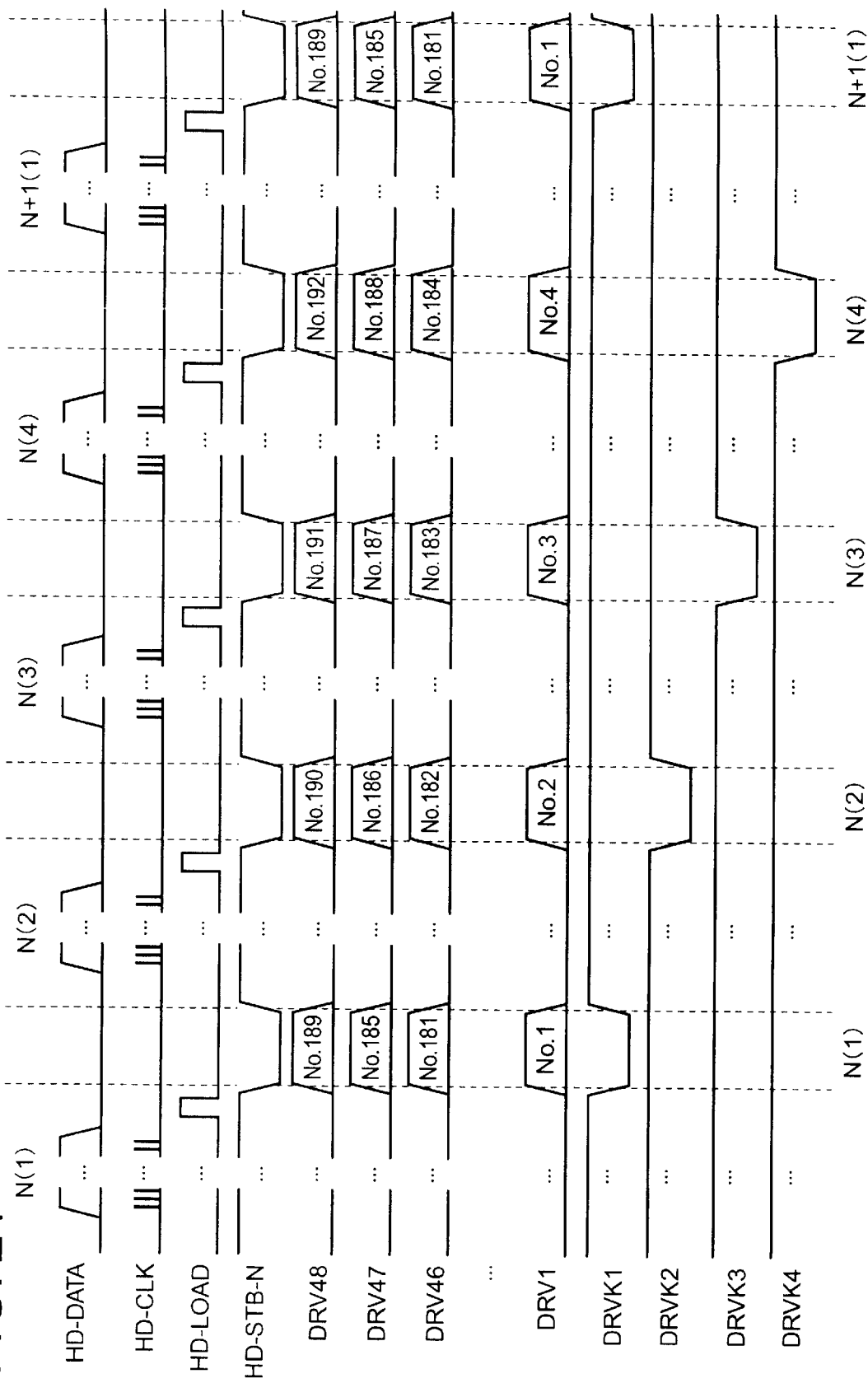

The operation of both versions of the third embodiment is illustrated in FIGS. 19, 20, and 21, which show the printing of the N-th dot line, N being an arbitrary integer.

Before printing begins, the compensation data are loaded into the memory circuits substantially as described in the first and second embodiments. Twenty transfer-load-write operations are carried out in the first version of the third embodiment (FIG. 17), and eight transfer-load-write operations in the second version (FIG. 18).

Referring to FIG. 19, a dot line is printed in four parts. First, the data for the first part N(1) are transferred on the HD-DATA signal line into the shift register comprising flip-flops 76–78 in synchronization with the clock signal (HD-CLK), latched in the latches 79–81 in synchronization with the load signal (HD-LOAD), and printed in synchronization with the strobe signal (HD-STB-N). Next, the data for the second part N(2), third part N(3), and fourth part N(4) are similarly transferred, latched, and strobed, followed by the data for the first part of the next line N+1 (1). Each time the load signal is activated to latch the transferred data, the multiplexers in the LED driver ICs 4 switch from selecting one memory circuit or cell to the next, and the cathode driver ICs 5 switch from selecting one cathode driver to the next.

FIG. 20 shows an enlarged view of segment A in FIG. 19. The first part of each dot line includes dots No. 1, No. 5, No. 9, as indicated at the right for line N+1(1), and every fourth subsequent dot up to dot No. 4889. Similarly, the second part of each dot line includes every fourth dot from dot No. 2 to dot No. 4990, the third part includes every fourth dot from dot No. 3 to dot No. 4991, and the fourth part includes every fourth dot from dot No. 4 to dot No. 4992, as indicated for line N.

Referring to FIG. 21, when the load signal (HD-LOAD) is activated to latch the data N(1) for the first part of line N, in each cathode driver IC 5, the cathode driver 109 ($DRVK_1$) that drives the corresponding LEDs is selected. In each LED driver IC 4, the memory circuits or memory cells that store compensation data for these LEDs are selected. For example, in FIG. 17, multiplexer 94 selects memory circuit 91 ($M_1$), which stores compensation data for LED 130 (dot No. 1), and multiplexer 92 selects memory circuit 85 ($M_{189}$), which stores compensation data for LED 41 (dot No. 189). In FIG. 18, multiplexer 125 selects memory cell 122 ($M_1$), which stores the least significant bit of compensation data for LED 130, and multiplexer 123 selects memory cell 116 ($M_{189}$), which stores the least significant bit of compensation data for LED 41. Thus when the strobe signal (HD-STN-B) goes low and cathode driver 109 ($DRVK_1$) drives cathode output pad 105 to the low (ground) level as shown in FIG. 21, the LEDs coupled to the corresponding cathode input pad 101 are driven according to the proper compensation data.

For example, LED 130 (dot No. 1) is driven according to the five bits of compensation data in memory circuit 91 (FIG. 17), or according to the four bits of compensation data in memory circuit 112 and the least significant bit in memory cell 122 (FIG. 18), provided latch 81 holds active ('1') dot data. LED 41 (dot No. 189) is driven according to the five bits of compensation data in memory circuit 85 (FIG. 17), or according to the four bits of compensation data in memory circuit 110 and the least significant bit in memory cell 116 (FIG. 18), provided latch 79 holds active dot data. The non-selected cathode drivers ($DRVK_4$, $DRVK_3$, $DRVK_2$) maintain high-logic-level output, so the LEDs connected to cathode input pads 98, 99, 100 are not driven.

Similarly, when the load signal is activated to latch the data N(2) for the second part of line N, cathode driver 108 ($DRVK_2$) is selected, and the memory circuits or memory cells storing compensation data for the LEDs that print dots No. 2, 6, etc. are selected. In like manner, cathode driver 107 ($DRVK_3$) and the compensation data for dots No. 3, 7, etc. are selected when the load signal is activated to latch the data N(3) for the third part of line N, and cathode driver 106 ($DRVK_4$) and the compensation data for dots No. 4, 8, etc. are selected when the load signal is activated to latch the data N(4) for the fourth part of line N. In each case, when the strobe signal goes low, the selected cathode driver drives the corresponding cathode output pad to the low logic level, and the LEDs connected to the corresponding cathode input pad are driven according to the selected compensation data and the dot data held in the latches 79–81, while the non-selected cathode drivers maintain high ($V_{DD}$) output, so that the other LEDs are not driven.

The third embodiment reduces the cost of the print head by reducing the number of flip-flops and other circuit elements in each LED driver IC 4, thereby reducing the size of the LED driver IC 4 so that more LED driver ICs can be fabricated from a single semiconductor wafer. In addition, the third embodiment further reduces the cost of the print head by reducing the number of bonding wires needed to interconnect an LED driver IC 4 to an LED array chip 3, and facilitates the wire bonding process by increasing the space between the bonding wires. If the dot resolution is 600 dpi, for example, the spacing between bonding wires is increased to substantially one hundred sixty-nine micrometers (169 μm), as compared to 84.7 μm in the first and second embodiments, and 42.3 μm if dynamic driving is not employed.

In the second version of the third embodiment, there is some loss of compensation accuracy because the most significant four bits of compensation data are shared by four LEDs, but if the LED output characteristics themselves vary slowly enough, the compensation data can be made to vary continuously, so that the loss of accuracy is not readily noticeable.

In a variation of the third embodiment, the lower x bits of y-bit compensation data are stored individually for each LED, and the remaining y-x bits are shared by n LEDs, where y is the bit length of the compensation data, x is less than y but greater than one, and n is the multiplexing factor. Sufficient compensation accuracy can be maintained by increasing x as n increases.

Next, a fourth embodiment will be described. The fourth embodiment is similar to the first embodiment, but uses dynamic multiplexers. The description will concentrate on the structure and operation of the dynamic multiplexers.

Figure 22:
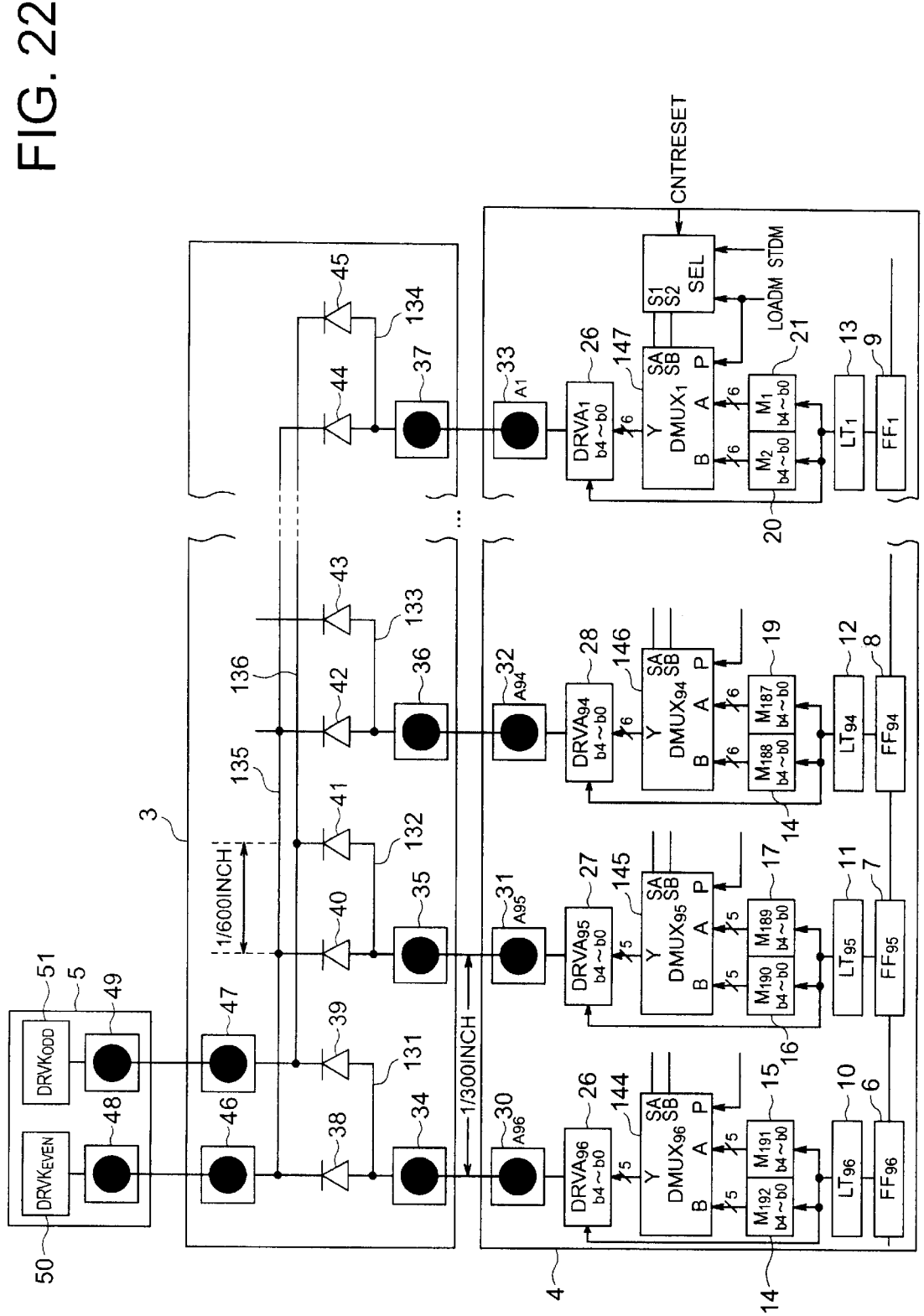
FIG. 22 illustrates the circuit structure of an LED head according to a fourth embodiment.

Referring to FIG. 22, the dynamic multiplexers 144, 145, 146, 147 ($DMUX_1$–$DMUX_{96}$) have input terminals designated A, B, SA, SB, and P, and output terminals designated Y. The A and B input terminals receive respective five-bit parallel data from one of the memory circuits 14–21. The SA and SB input terminals receive selection signals from a selector (SEL) 148. The P (precharge) input terminal receives a signal LOADN that is complementary to the load signal HD-LOAD; the inverter that inverts HD-LOAD to generate LOADN has been omitted from the drawing for simplicity. The output signals Y are five-bit parallel signals that are supplied to respective anode drivers 26–29.

The selector 148 receives the inverted load signal LOADN, the strobe signal HD-STB-N (denoted STBN in FIG. 22), and a count reset signal CNTRESET, and generates selection signals S1 and S2. Selection signal S1 is supplied to the SA input terminals of the dynamic multiplexers 144–147; selection signal S2 is supplied to the SB input terminals of the dynamic multiplexers.

The other elements in FIG. 22 are identical to the corresponding elements in the first embodiment (FIG. 12).

Figure 23:
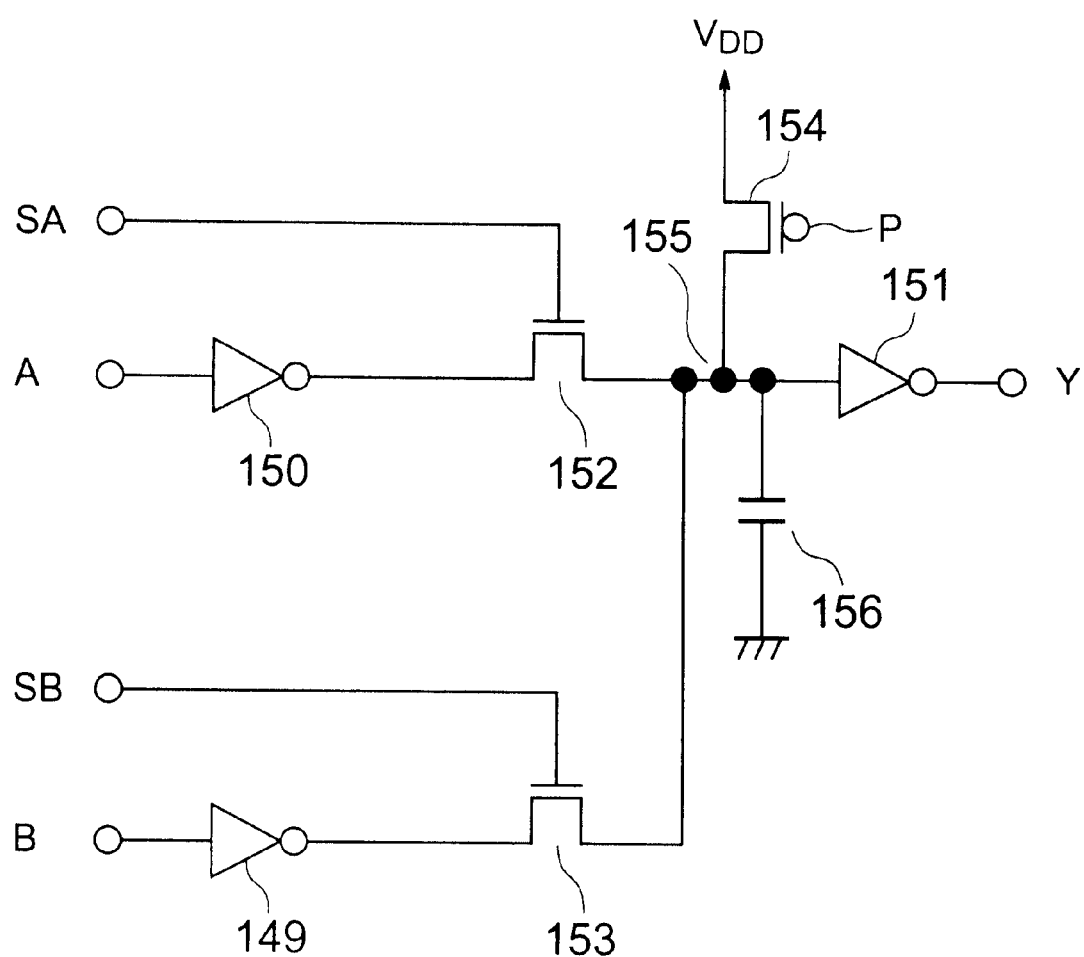
FIG. 23 is a circuit diagram illustrating a dynamic multiplexer used in the fourth embodiment.

The dynamic multiplexers 144–147 have the internal structure shown in FIG. 23, each comprising, for each output bit, three CMOS inverters 149, 150, 151, two NMOS transistors 152, 153, and a PMOS transistor 154. One bit of A input is inverted by inverter 150; the resulting inverted signal is supplied to the source electrode of NMOS transistor 152, the gate electrode of which is driven by selection signal SA. One bit of B input is inverted by inverter 149; the resulting inverted signal is supplied to the source electrode of NMOS transistor 151, the gate electrode of which is driven by selection signal SB. The source electrode of PMOS transistor 154 is connected to the power supply $V_{DD}$; the gate electrode of this transistor 154 receives the precharge signal P. The drain electrodes of transistors 152, 153, 154 are interconnected at a common node 155 from which one bit of output Y is generated. Specifically, this node 155 is connected to the input terminal of inverter 151, and the Y output bit is obtained from the output terminal of inverter 151. The gate capacitance of inverter 151 and the parasitic capacitance of the wiring interconnecting inverter 151 and transistors 152, 153, 154 form a distributed capacitance which, for convenience, is shown in the drawing as if it were a lumped capacitance 156 coupled between node 155 and ground.

Figure 24:
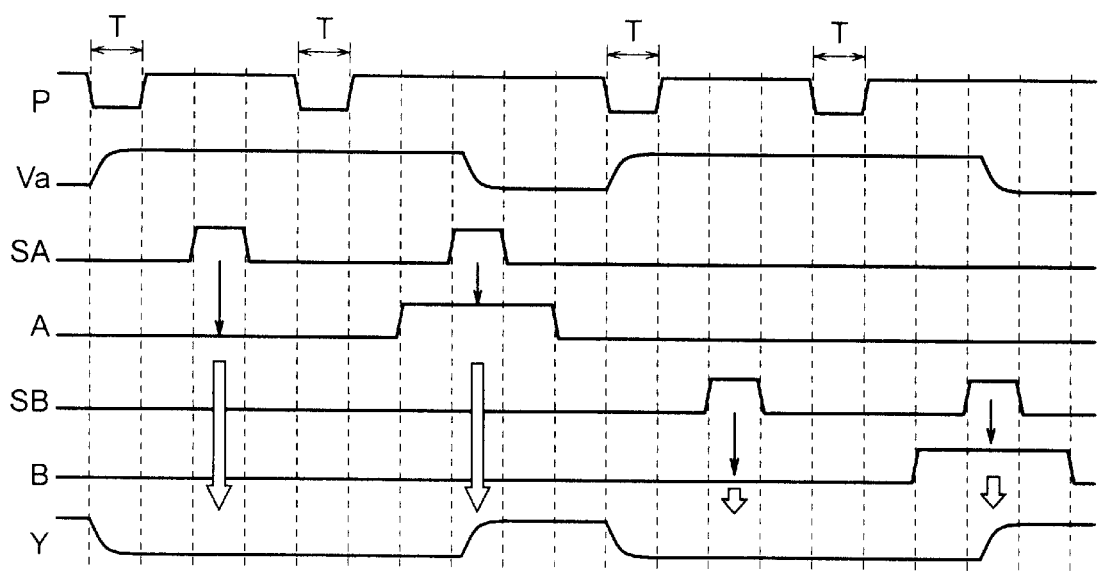
FIG. 24 is a timing waveform diagram illustrating the operation of the dynamic multiplexer circuit in FIG. 23.

FIG. 24 illustrates the operation of the dynamic multiplexer circuit in FIG. 23, showing waveforms of the precharge signal P, selection signals SA and SB, input signals A and B, and output signal Y, and the potential $V_{CL}$ of node 155, which is also the voltage to which capacitance 156 is charged.

Initially, all input signals are at the low logic level, except for the precharge signal P. When the precharge signal P is activated (driven low), PMOS transistor 154 is switched on and capacitance 156 ($V_{CL}$) is charged to the high level. This logic level is inverted by inverter 151, so the output signal Y goes low. After an interval T long enough for the charging of capacitance 156 to be completed, the precharge signal P is inactivated (driven high). Node 155 ($V_{CL}$) remains at the high logic level for the time being.

This precharge operation is repeated four times in FIG. 24, each time charging node 155 ($V_{CL}$) to the high level (or maintaining it at the high level) and returning the output signal Y to the low level (or maintaining Y at the low level). Following each precharge interval T, selection signal SA or SB goes high to drive the corresponding NMOS transistor 152 or 153.

Following the first two precharge intervals, selection signal SA goes high. If input signal A is low, as shown after the first precharge interval T, then the output of inverter 150 is high and the status quo is maintained: NMOS transistor 152 remains off (although its gate electrode is driven high by signal SA, its source electrode is also high, so its gate-source voltage is 0 V); $V_{CL}$ remains high; and the output Y remains low. If input signal A is high, as shown after the second precharge interval T, then the output of inverter 150 is low, NMOS transistor 152 is turned on (its gate-source voltage now being $V_{DD}$), $V_{CL}$ quickly discharges to the low (ground) level through NMOS transistor 152 and inverter 150, and the output signal Y goes high. The high output level is maintained even after SA goes low, until the next precharge interval.

During these operations, since selection signal SB remains low, NMOS transistor 153 remains switched off and input signal B has no effect on the output signal Y, which takes on the same high or low logic level as input signal A.

Following the third and fourth precharge intervals, selection signal SB goes high. If input signal B is low, as shown after the third precharge interval T, then the output of inverter 149 is high, NMOS transistor 153 remains off (despite being driven by signal SB), $V_{CL}$ remains high, and Y remains low. If input signal B is high, as shown after the fourth precharge interval T, then the output of inverter 150 is low, NMOS transistor 153 is turned on, $V_{CL}$ goes low, and Y goes high. Since selection signal SA remains low, NMOS transistor 152 remains switched off and input signal A has no effect on the output signal Y, which takes on the same high or low logic level as input signal B.

Figure 25:
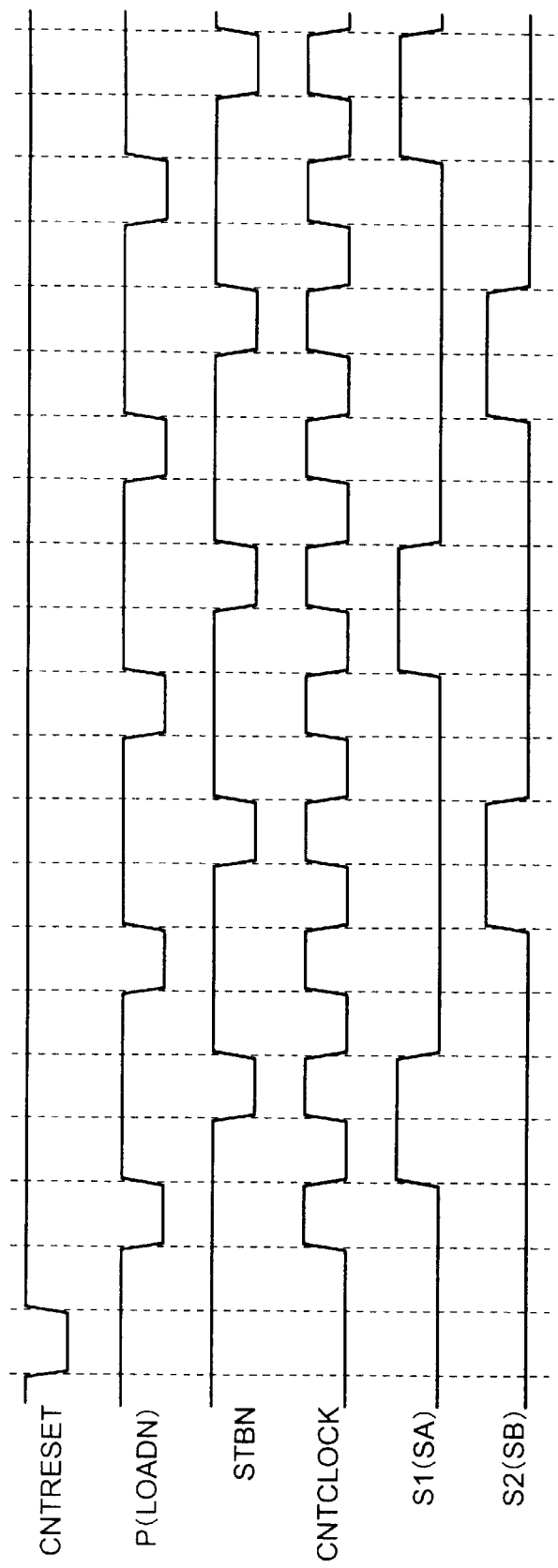
FIG. 25 is a timing waveform diagram illustrating the operation of the selector in FIG. 22.

FIG. 25 illustrates the operation of the selector 148, showing waveforms of the count reset signal CNTRESET, the precharge signal P (LOADN), the strobe signal HD-STB-N (STBN), an internal count clock signal CNTCLOCK, and the selection signals S1 (SA) and S2 (SB).

The selector 148 is initialized when the count reset signal CNTRESET goes low. The count reset signal CNTRESET is generated by the printing control unit 1 and goes low at, for example, the top of each page.

After CNTRESET returns to the high level, the selector 148 operates on the falling edges of the inverted load signal LOADN and the strobe signal STBN. The count clock signal CNTCLOCK is generated by performing a type of logical difference operation on LOADN and STBN (e.g., a logical NOT-AND operation, or a logical exclusive-OR operation). The selection signals S1 and S2 are generated by circuitry in the selector 148 that counts cycles of the count clock signal CNTCLOCK, a cycle being defined as the interval from one falling edge of CNTCLOCK to the next. As shown in FIG. 25, selection signal S1 is activated during the first, fifth, and ninth CNTCLOCK cycles; S2 is activated during the third and seventh CNTCLOCK cycles. The selector 148 continues to generate both selection signals S1, S2 in this manner, activating them in alternate odd-numbered CNTCLOCK cycles.

From FIGS. 24 and 25 it can be seen that the selector 148 causes the dynamic multiplexers to select the memory circuits 14–21 in the manner described in the first embodiment. Each time the load signal is activated, the multiplexers are precharged, then one of the two selection signals, either S1 (SA) or S2 (SB), is activated, selecting input (A or B) from one of the two sets of memory circuits. The selection starts with the odd-numbered memory circuits (input A) and alternates at each successive load signal. The activated selection signal remains active while the strobe signal is activated. Each LED is therefore driven according to the correct compensation data.

The precharging operation, which sets the multiplexer output signals Y to the low logic level as shown in FIG. 24, enables the anode drivers to respond promptly when activated by the strobe signal (HD-STB-N), since the low level is the level that turns on the auxiliary driving transistors.

Figure 9:
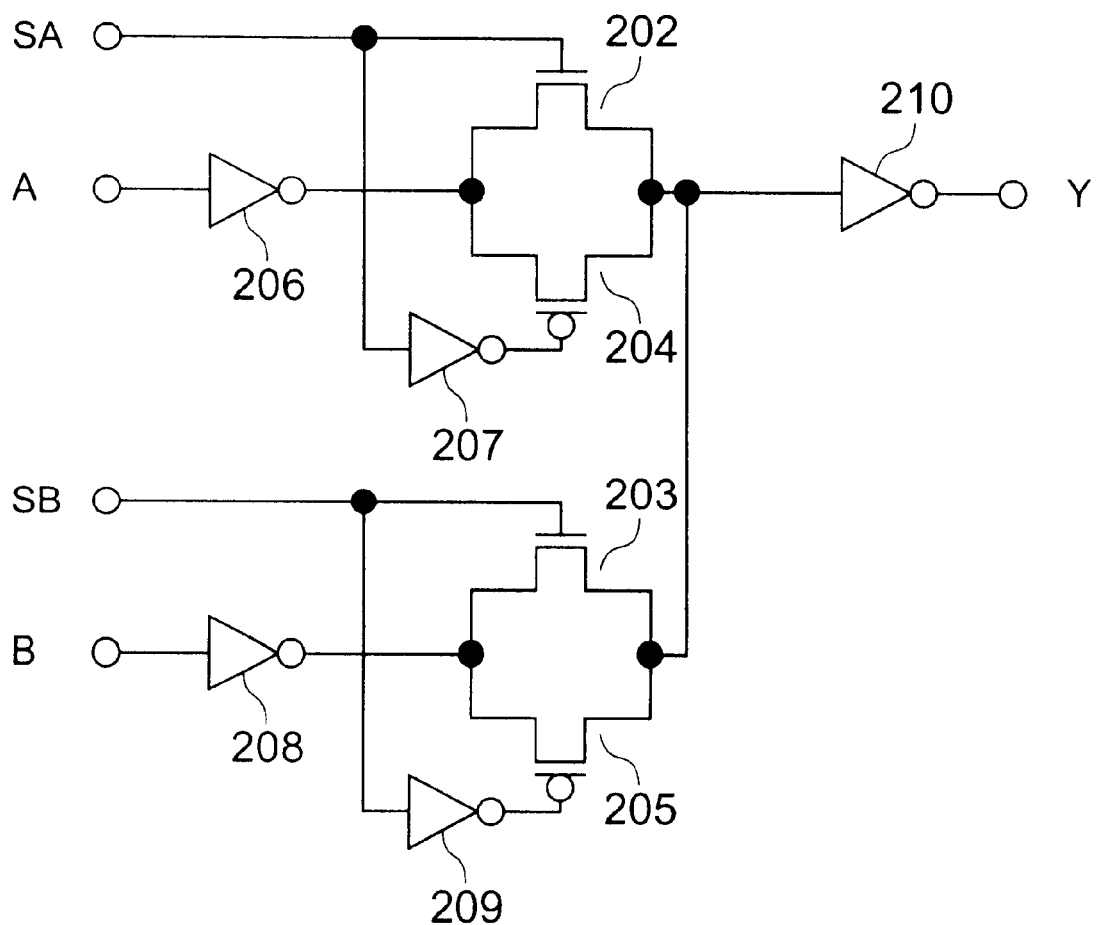
FIG. 9 is a circuit diagram of another conventional multiplexer.
Figure 10:
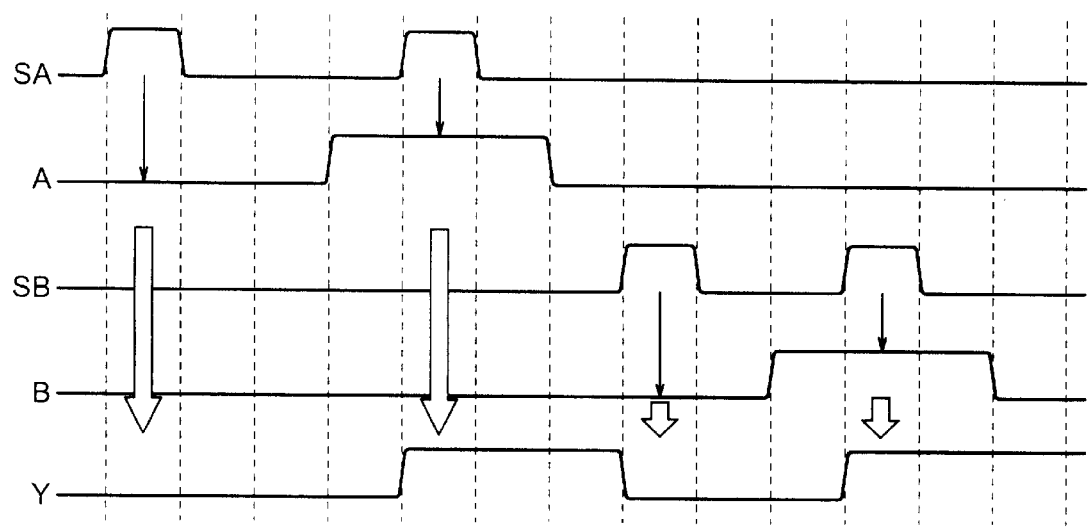
FIG. 10 is a timing diagram illustrating the operation of the multiplexer in FIG. 9.

Compared with the conventional multiplexer shown in FIG. 9, the dynamic multiplexer in FIG. 23 uses a single PMOS transistor 154 to charge node 155 to the high level, instead of using a separate PMOS transistor for each input bit, and a separate inverter to control each of these PMOS transistors. Each CMOS inverter 149, 150, 151 in FIG. 23 includes two transistors, so the dynamic multiplexers 144–147 require only nine transistors per output bit. This compares favorably with, for example, the fourteen transistors needed in the conventional multiplexer circuit in FIG. 9. By reducing the number of transistors, the fourth embodiment reduces the size and thus the cost of the LED driver ICs 4, while providing the advantageous precharge function that was lacking in FIG. 9.

The circuit configuration in FIG. 23 can be adapted to higher multiplexing factors by adding one inverter and one NMOS transistor for each additional input signal. The dynamic multiplexer circuits of the fourth embodiment can thus be used in the third embodiment, for example. As the number of input signals is increased, the advantage of the fourth embodiment in terms of reduced circuit size also increases.

The fourth embodiment has another advantage in that it protects the LED head 2 from overheating under abnormal input conditions. If, for example, a program error in the printing control unit 1 causes the LEDs in the LED head 2 to be left on for an extended time, eventually the charge stored in the capacitance 156 in FIG. 23 will leak away to ground, due to the current leakage that occurs in all CMOS circuits and other similar types of semiconductor circuits. The multiplexer output Y will then go to the high level, which is the level that turns off the corresponding auxiliary driving transistor in the anode driver. As a result, in at most a few tens of minutes, all current supplied according to the compensation data will be switched off, so that the LEDs are driven at their minimum current levels. Preferably, the latches or the anode drivers are structured so that a similar leakage effect turns off the main driving transistors and the LEDs are switched off completely.

Not overheating despite abnormal input is a required safety performance characteristic that is tested in LED printers and LED heads. The fourth embodiment can help to provide the necessary safety performance.

Although FIG. 23 showed a dynamic multiplexer configuration in which a plurality of NMOS transistors were coupled to a single PMOS transistor, an equivalent type of dynamic multiplexer can be configured by connecting a plurality of PMOS transistors to a single NMOS transistor. This design is suitable if, for example, the high output level of the dynamic multiplexers turns on the transistors in the anode drivers.

The multiplexer and selector of the fourth embodiment can also be used in the second embodiment.

Although the invention has been described in relation to an LED printer, the invention is also applicable to other types of image-forming apparatus, such as a thermal printer in which the driven elements are a row of resistive heat-emitting elements, or a display device in which the driven elements are display elements.

Those skilled in the art will recognize that other variations are possible within the scope claimed below.

What is claimed is:

1. A print head comprising:

a plurality of print units, wherein each of the print units includes a predetermined number of driven elements (38, 39, 40, 41, 42, 43, 44, 45) each having a first terminal and a second terminal;

a plurality of first driving elements (26, 27, 28, 29), each of which is connected in common to the first terminals of a plurality of the driven elements selected in a first combination from the predetermined number of the driven elements (38, 39, 40, 41, 42, 43, 44, 45);

a plurality of second driving elements (50, 51), each of which is connected in common the second terminals of a plurality of the driven elements selected in a second combination different from the first combination from the predetermined number of the driven elements (38, 39, 40, 41, 42, 43, 44, 45);

compensation data memories (14 to 21) in a one-to-one correspondence with the predetermined number of the driven elements (38, 39, 40, 41, 42, 43, 44, 45), each of which stores compensation data specifying a compensation value for adjusting energy to be supplied to a corresponding driven element; and multiplexers (22, 23, 24, 25,) in a one-to-one correspondence with the plurality of the first driving elements (26, 27, 28, 29), each of which selects one of a plurality of the compensation data memories corresponding to a plurality of the driven elements connected in common to a corresponding first driving element, and outputting compensation data stored in the selected compensation data memory to the corresponding first driving element.

2. The print head of claim 1, wherein the plurality of second driving elements included in the print units are driven one at a time, and each of the multiplexers selects the compensation data memory corresponding to the driven element connected to the second driving element that is driven.

3. The print head of claim 1, wherein each of the compensation data memories comprises:

a first memory circuit storing common compensation data for all of the driven elements connected to one of the first driving elements; and a plurality of second memory circuits storing individual compensation data for individual ones of the driven elements connected to said one of the first driving elements.

4. The print head of claim 3, wherein the common compensation data stored in the first memory circuit are more significant than the data stored in the plurality of second memory circuits.

5. The print head of claim 1, wherein each of the multiplexers comprises:

a first transistor having a channel of a first type; and a plurality of second transistors, having channels of a second type different from the first type, connected to the first transistor at a common node;

wherein the first transistor and the second transistors are metal-oxide-semiconductor transistors; and wherein only one transistor of the first transistor and the second transistors is driven at a time.

6. The print head of claim 5, wherein the second transistors supply different bits of compensation data from a corresponding one of the compensation data memories to the common node, and one bit of compensation data is generated from the common node for supply to a corresponding one of the first driving elements.

7. The print head of claim 6, wherein the first transistor is driven to precharge the common node to a predetermined potential, then one of the second transistors is driven, and these operations are repeated, with different ones of the second transistors being driven in a cyclic sequence.

8. The print head of claim 7, wherein the first transistor supplies a power-supply potential to said common node.

9. The print head of claim 7, wherein the first transistor supplies a ground potential to said common node.

10. The print head of claim 1, wherein the driven elements are light-emitting elements.

11. The print head of claim 10, wherein the driven elements are light-emitting diodes.

12. The print head of claim 1, wherein the driven elements are heat-emitting elements.

13. An image-forming device comprising:

the print head of claim 1; and a printing control unit that transfers the compensation data to the print head.

* * * * *